United States Patent
Tsai et al.

(10) Patent No.: US 8,378,358 B2
(45) Date of Patent: Feb. 19, 2013

(54) LIGHT EMITTING DEVICE

(75) Inventors: Hsin-Chang Tsai, Taipei (TW); Chia-Hao Liang, Taipei (TW); Jen-Ta Chiang, Taipei (TW)

(73) Assignee: Everlight Electronics Co., Ltd., New Taipei (TW)

( * ) Notice: Subject to any disclaimer, the term of this patent is extended or adjusted under 35 U.S.C. 154(b) by 378 days.

(21) Appl. No.: 12/851,556

(22) Filed: Aug. 6, 2010

(65) Prior Publication Data

US 2010/0295071 A1 Nov. 25, 2010

Related U.S. Application Data

(63) Continuation-in-part of application No. 12/703,201, filed on Feb. 10, 2010, which is a continuation-in-part of application No. 12/610,371, filed on Nov. 2, 2009.

(51) Int. Cl.
H01L 27/15 (2006.01)
H01L 31/12 (2006.01)
H01L 33/00 (2010.01)

(52) U.S. Cl. ............... 257/79; 257/81; 257/88; 257/98; 257/E33.068

(58) Field of Classification Search ............ 257/E33.068
See application file for complete search history.

(56) References Cited

U.S. PATENT DOCUMENTS

| | | | |
|---|---|---|---|
| D173,157 S | 10/1954 | Hurley | |
| 2,736,097 A | 2/1956 | Coleman, Jr. | |
| 2,913,576 A | 11/1959 | Gilleard | |
| D209,534 S | 12/1967 | Eisenberg | |
| 3,780,286 A | 12/1973 | Alexieff et al. | |
| 4,935,665 A | 6/1990 | Murata | |
| D329,102 S | 9/1992 | Dieperink | |
| D334,077 S | 3/1993 | Dieperink et al. | |
| D365,409 S | 12/1995 | Lu | |
| 5,836,676 A | 11/1998 | Ando et al. | |
| D486,262 S | 2/2004 | Chen | |
| D517,725 S | 3/2006 | Egawa et al. | |
| 7,360,923 B2 | 4/2008 | Weber-Rabsilber et al. | |
| D606,703 S | 12/2009 | Sugishita et al. | |
| 7,659,552 B2 | 2/2010 | Chang | |
| D615,240 S | 5/2010 | Sugishita et al. | |
| D618,384 S | 6/2010 | Chen et al. | |

(Continued)

FOREIGN PATENT DOCUMENTS

| CN | 1684278 | 10/2005 |
|---|---|---|
| CN | 1698202 | 11/2005 |

(Continued)

OTHER PUBLICATIONS

"Search Report of Europe Counterpart Application of prior application" issued on May 6, 2010, p. 1-p. 7.

(Continued)

*Primary Examiner* — Thien F Tran
(74) *Attorney, Agent, or Firm* — Jianq Chyun IP Office

(57) ABSTRACT

A light emitting device includes a carrier, a light emitting element electrically connected to the carrier, a transparent plate having at least one through hole formed therein and including a flat-portion and a lens-portion and a permeable membrane structure disposed on a surface of the transparent plate. The lens-portion covers the light emitting element and has a light incident surface, a light emitting surface, a first and a second side surfaces. A first partial beam of the light beam passes through the light incident surface and leaves from the light emitting surface. A second partial beam of the light beam passes through the light incident surface and is transmitted to the first or the second side surface. The first or the second side surface reflects at least a part of the second partial beam of the light beam to be passed through the light emitting surface.

26 Claims, 24 Drawing Sheets

U.S. PATENT DOCUMENTS

| | | | |
|---|---|---|---|
| D619,752 S | 7/2010 | Zhang | |
| 7,841,750 B2 | 11/2010 | Wilcox et al. | |
| D646,015 S | 9/2011 | Chiang et al. | |
| 2002/0060316 A1 | 5/2002 | Matsuyama | |
| 2006/0007553 A1 | 1/2006 | Bogner et al. | |
| 2006/0124953 A1 | 6/2006 | Negley et al. | |
| 2007/0019409 A1 | 1/2007 | Nawashiro et al. | |
| 2007/0114551 A1 | 5/2007 | Kawaguchi et al. | |

FOREIGN PATENT DOCUMENTS

| | | |
|---|---|---|
| CN | 201190931 | 2/2009 |
| CN | 101408286 | 4/2009 |
| CN | 101463989 | 6/2009 |
| CN | 201368346 | 12/2009 |
| CN | 100585268 | 1/2010 |
| CN | 101625092 | 1/2010 |
| CN | 201382339 | 1/2010 |
| DE | 19623881 | 12/1997 |
| EP | 0976589 | 2/2000 |
| EP | 1045453 | 10/2000 |
| JP | D1081523 | 7/2000 |
| JP | 2006-156662 | 6/2006 |
| KR | 100742095 | 7/2007 |
| TW | 236537 | 12/1994 |
| TW | 236538 | 12/1994 |
| TW | 552069 | 9/2003 |
| TW | I241040 | 10/2005 |
| TW | I246576 | 1/2006 |
| TW | M349984 | 2/2009 |
| TW | M352632 | 3/2009 |
| TW | M358259 | 6/2009 |
| TW | D129620 | 7/2009 |
| WO | 2006089450 | 8/2006 |

OTHER PUBLICATIONS

"Search Report of Europe Counterpart Application of co-pending application" issued on Jul. 15, 2010, p. 1-p. 8.

"1st Office Action of US Co-pending Application", issued on Jan. 20, 2011, p. 1-p. 15.

"Office Action of Taiwan counterpart application" issued on May 29, 2012, p. 1-p. 7.

"First Office Action of China Counterpart Application", issued on Mar. 12, 2012, p. 1-p. 5.

"Office Action of U.S. Appl. No. 12/703,201", issued on Apr. 5, 2012, pp. 1-8.

"Notice of Allowance of U.S. co-pending application" issued on Jun. 16, 2011, p. 1-p. 16.

"Final Office Action of U.S. co-pending application" issued on Jul. 13, 2011, p. 1-p. 16.

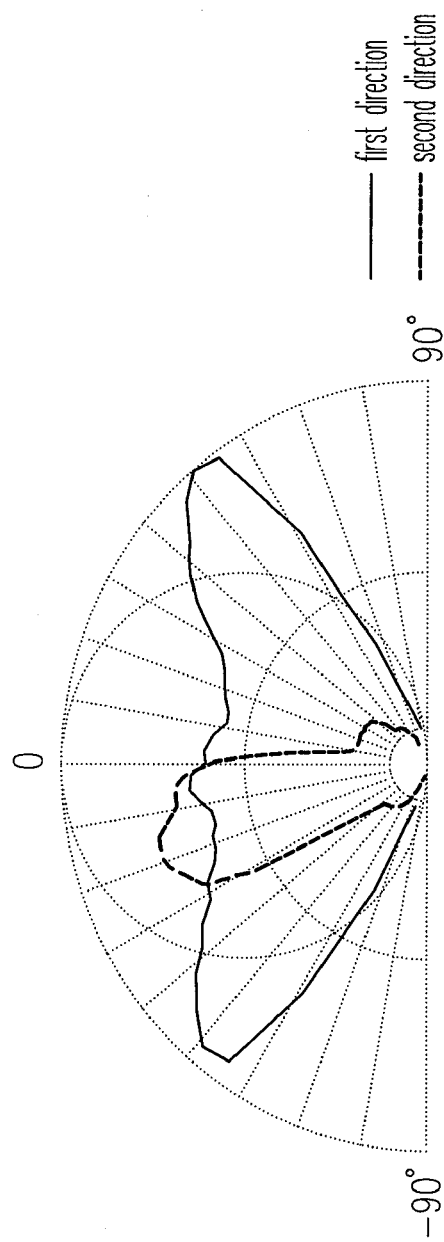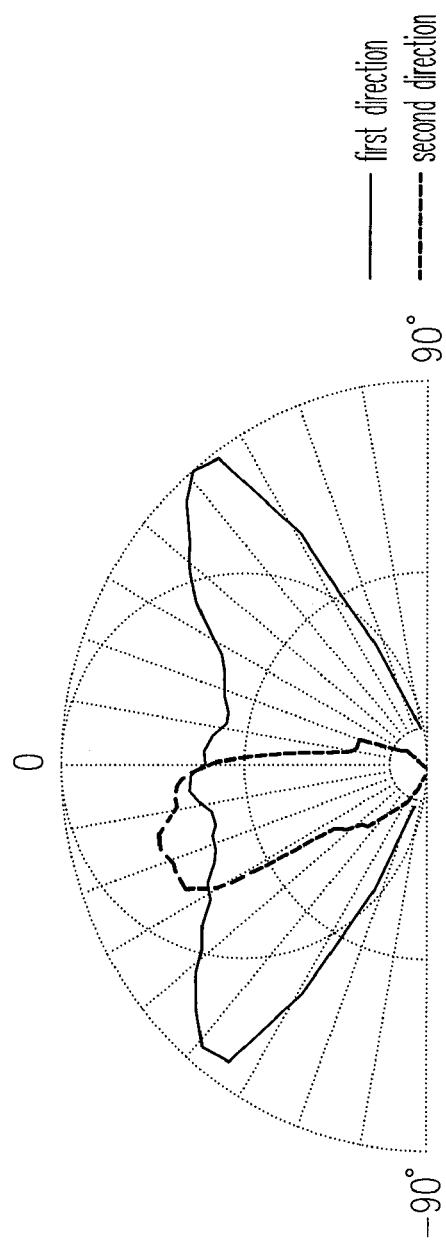

LIGHT EMITTING DEVICE

CROSS-REFERENCE TO RELATED APPLICATION

This application is a continuation in part application of and claims the priority benefit of U.S. application Ser. No. 12/703,201, filed on Feb. 10, 2010, now pending, which claims the priority benefit of Taiwan application Ser. No. 98137149, filed on Nov. 2, 2009. The prior U.S. application Ser. No. 12/703,201 is a continuation in part application of and claims the priority benefit of an U.S. application Ser. No. 12/610,371, filed on Nov. 2, 2009, now pending, which claims the priority benefit of Taiwan application no. 98105180, filed on Feb. 18, 2009. The entirety of each of the above-mentioned patent applications is hereby incorporated by reference herein and made a part of this specification.

BACKGROUND OF THE INVENTION

1. Field of the Invention

The present invention relates to a light emitting device, more particularly, to a light emitting device with a better light emitting uniformity and efficiency.

2. Description of Related Art

A light emitting diode (LED) is a light emitting element constituted by a semiconductor material having group III-V elements. The LED has advantages such as long service life, small volume, high shock resistance, low heat output, and low power consumption. Thus, it has been widely utilized in indicators or light sources for household appliances and various instruments. In recent years, the LED has been developed towards multicolor and high brightness; therefore, its application scope has been expanded to large outdoor display boards, traffic signal lights, and the like. In the future, the LED may even become the main illumination light source with both power-saving and environment-protecting functions.

In the designs of conventional LED illumination modules, the light beam emitted by the LED is projected directly. In other words, the light beam generated by the LED has high directivity, and thus may result in unfavorable light uniformity and glares that would cause discomfort of the user. Moreover, when the LEDs of multiple colors are combined, as the light from these LEDs is emitted forward directly, a large light mixing area is needed to harmonize the light. The size of the whole LED illumination device is increased as a consequence, which causes inconvenience.

To resolve the aforementioned problems, optical glass is usually cooperated in the current LED illumination modules, so that the light beam emitted by the LED can be utilized effectively. However, if the optical glass is covered on the LED, then an illumination angle generated by the entire LED illumination module may be too small or focused at a certain region, while even having problems such as non-uniform light or low color render index of the light source.

SUMMARY OF THE INVENTION

An embodiment of the invention provides a light emitting device, which includes a transparent plate for enhancing the light emitting uniformity of the light emitting device.

An embodiment of the invention provides a light emitting device, which includes a carrier, a light emitting element, a transparent plate and a permeable membrane structure. The light emitting element is disposed on the carrier and electrically connected to the carrier. The transparent plate is disposed on the carrier and has at least one through hole formed therein. The transparent plate includes a flat-portion and a lens-portion. The flat-portion has an upper surface and a lower surface relative to the upper surface, and the lower surface is directly disposed on the carrier. The lens-portion covers the light emitting element, and has a light incident surface, a light emitting surface relative to the light incident surface, and a first side surface and a second side surface connecting the upper surface and the light emitting surface. The light emitting element is suitable for emitting a light beam. A first partial beam of the light beam passes through the light incident surface and leaves from the light emitting surface. A second partial beam of the light beam passes through the light incident surface and is transmitted to the first side surface or the second side surface. The first side surface or the second side surface reflects at least a part of the second partial beam of the light beam to be passed through the light emitting surface. The permeable membrane structure disposed on a surface of the transparent plate. The permeable membrane structure covers an end of the through hole far away from the light emitting surface.

According to an embodiment of the invention, the first side surface and the second side surface are planes.

According to an embodiment of the invention, a tilting angle of the first side surface relative to the upper surface and a tilting angle of the second side surface relative to the upper surface are substantially different or the same.

According to an embodiment of the invention, the first side surface and the second side surface are respectively a plane and a curved surface.

According to an embodiment of the invention, the light incident surface is a curved surface concaving towards the light emitting surface.

According to an embodiment of the invention, the flat portion of the transparent plate further includes a trench which is disposed around the lower surface, and the trench is circularly disposed around the light emitting element.

According to an embodiment of the invention, the transparent plate further has a cavity at the side far away from the light emitting surface, the cavity communicates with the through hole, and the permeable membrane structure is disposed in the cavity.

According to an embodiment of the invention, the permeable membrane structure includes an adhesive layer and a porous membrane. The permeable membrane structure is adhered to the transparent plate via the adhesive layer.

An embodiment of the invention provides a light emitting device, which includes a carrier, a light emitting element, a transparent plate and a permeable membrane structure. The light emitting element is disposed on the carrier and electrically connected to the carrier. The transparent plate is disposed on the carrier and has at least one through hole formed therein. The transparent plate includes a flat-portion and a lens-portion. The flat-portion has an upper surface and a lower surface relative to the upper surface. The lower surface is directly disposed on the carrier. The lens-portion covers the light emitting element and has a light incident surface and a side surface and a positive camber connected to the upper surface. The light emitting element is suitable for emitting a light beam. A first partial beam of the light beam passes through the light incident surface and leaves the positive camber. A second partial beam of the light beam passes through the light incident surface and is transmitted to the side surface. The side surface reflects at least a part of the second partial beam of the light beam to be passed through the positive camber. The permeable membrane structure disposed on a surface of the transparent plate. The permeable membrane structure covers an end of the through hole far away from the light emitting surface.

According to an embodiment of the invention, the light incident surface is a curved surface concaving towards the positive camber.

According to an embodiment of the invention, a curvature of the light incident surface and a curvature of the positive camber are substantially different.

According to an embodiment of the invention, the flat portion of the transparent plate further comprises a trench which is disposed around the lower surface, and the trench is circularly disposed around the light emitting element.

According to an embodiment of the invention, the transparent plate further has a cavity at the side far away from the light emitting surface, the cavity communicates with the through hole, and the permeable membrane structure is disposed in the cavity.

According to an embodiment of the invention, the permeable membrane structure comprises an adhesive layer and a porous membrane, and the permeable membrane structure is adhered to the transparent plate via the adhesive layer.

An embodiment of the invention provides a light emitting device, which includes a carrier, at least one light emitting element, a transparent plate, a light shielding side wall structure and at least one permeable membrane structure. The light emitting element is disposed on the carrier and electrically connected to the carrier. The transparent plate is disposed on the carrier and has at least one through hole formed therein. The transparent plate includes a flat-portion and at least one lens-portion. The flat-portion has an upper surface and a lower surface opposite to the upper surface. The lower surface is closed to the carrier. The lens-portion covers the light emitting element. The light shielding side wall structure is disposed on the upper surface of the flat-portion and surrounding the lens-portion. The permeable membrane structure disposed on a surface of the transparent plate. The permeable membrane structure covers an end of the through hole far away from the light emitting surface.

According to an embodiment of the invention, the at least one light emitting element is a plurality of light emitting elements, the at least one lens-portion is a plurality of lens-portions, the lens-portions respectively cover the light emitting elements, the lens-portions are aligned into a plurality of rows and a plurality of columns to form a two-dimensional array. The light shielding side wall structure includes an outer reflective frame, a plurality of first reflective partition plates and a plurality of second reflective partition plates. The outer reflective frame is disposed on the upper surface of the flat-portion and surrounding the lens-portion. The first reflective partition plates is disposed on the upper surface of the flat-portion, wherein each of the first reflective partition plates is disposed between the two neighboring columns. The second reflective partition plates are disposed on the upper surface of the flat-portion, wherein each of the second reflective partition plates is disposed between the two neighboring rows.

According to an embodiment of the invention, the lens-portion has a light incident surface, a light emitting surface, a first side surface, and a second side surface, the light emitting surface being opposite to the light incident surface, the first side surface and the second side surface connecting the upper surface and the light emitting surface, the light emitting element is adapted to emit a beam, a first partial beam of the beam passes through the light incident surface and emerges from the light emitting surface, a second partial beam of the beam passes through the light incident surface and is transmitted to the first side surface or the second side surface, the first side surface or the second side surface reflects at least one part of the second partial beam of the beam, and the part of the second partial beam emerges from the light emitting surface, and the light shielding side wall structure is adapted to reflect a part of the beam.

According to an embodiment of the invention, the first side surface and the second side surface are flat surfaces.

According to an embodiment of the invention, a tilting angle of the first side surface and a tilting angle of the second side surface relative to the upper surface are substantially different or the same.

According to an embodiment of the invention, the first side surface and the second side surface are respectively a flat surface and a curved surface, and the light incident surface is a curved surface concaving toward the light emitting surface.

According to an embodiment of the invention, the lens-portion has a light incident surface, a side surface, and an outer curved surface, the side surface and the outer curved surface is connected to the upper surface, the light emitting element is adapted to emit a beam, a first partial beam of the beam passes through the light incident surface and emerges from the outer curved surface, a second partial beam of the beam passes through the light incident surface and is transmitted to the side surface, the side surface reflects at least one part of the second partial beam of the beam, and the part of the second partial beam emerges from the outer curved surface, and the light shielding side wall structure is adapted to reflect a part of the beam.

According to an embodiment of the invention, the light incident surface is a curved surface concaving towards the outer curved surface.

According to an embodiment of the invention, a curvature of the light incident surface and a curvature of the outer curved surface are substantially different.

According to an embodiment of the invention, the flat portion of the transparent plate further comprises a recess which is disposed around the lower surface, and the recess is circularly disposed around the light emitting element.

According to an embodiment of the invention, the transparent plate further has a cavity at the side far away from the light emitting surface, the cavity communicates with the through hole, and the permeable membrane structure is disposed in the cavity.

According to an embodiment of the invention, the permeable membrane structure comprises an adhesive layer and a porous membrane, and the permeable membrane structure is adhered to the transparent plate via the adhesive layer.

In light of the foregoing, in the embodiment of the invention, the light emitting element is covered by the lens-portion of the transparent plate, so that the first partial beam of the light beam emitted by the light emitting element passes through the light incident surface and the light emitting surface with different curvatures. The second partial beam of the light beam passes through the light incident surface and is transmitted to a cut-off surface. Moreover, the cut-off surface allows a part of the second partial beam to passes through the light emitting surface. Therefore, not only are the light intensity and the light emitting uniformity of the light emitting device enhanced, but the illuminance distribution of the light emitting element can also be controlled through the cut-off surface. Also, the occurrence of glares and double-visions can be prevented for the light emitting device to achieve a better illumination effect.

Furthermore, in the embodiment of the invention, the light shielding side wall structure is adopted to cut off or reflect the beam having the large emitting angle emerging from the lens-portion. Accordingly, the light emitting device has a smaller emitting angle. In addition, the light emitting device of the present invention has permeable membrane structure, so as to achieve the dust-proof, moisture-proof and air-permeable effects of the light emitting device, and further uniformize the light emitted by the light-emitting element, thereby achieving better illumination effect.

In order to make the aforementioned and other features and advantages of the present invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 7A is a light emitting intensity distribution of the light emitting device without the light shielding side wall structure and the transparent plate in FIG. 6A.

FIG. 7B is the light emitting intensity distribution of the light emitting device in FIG. 6A.

DESCRIPTION OF THE EMBODIMENTS

Figure 1A:
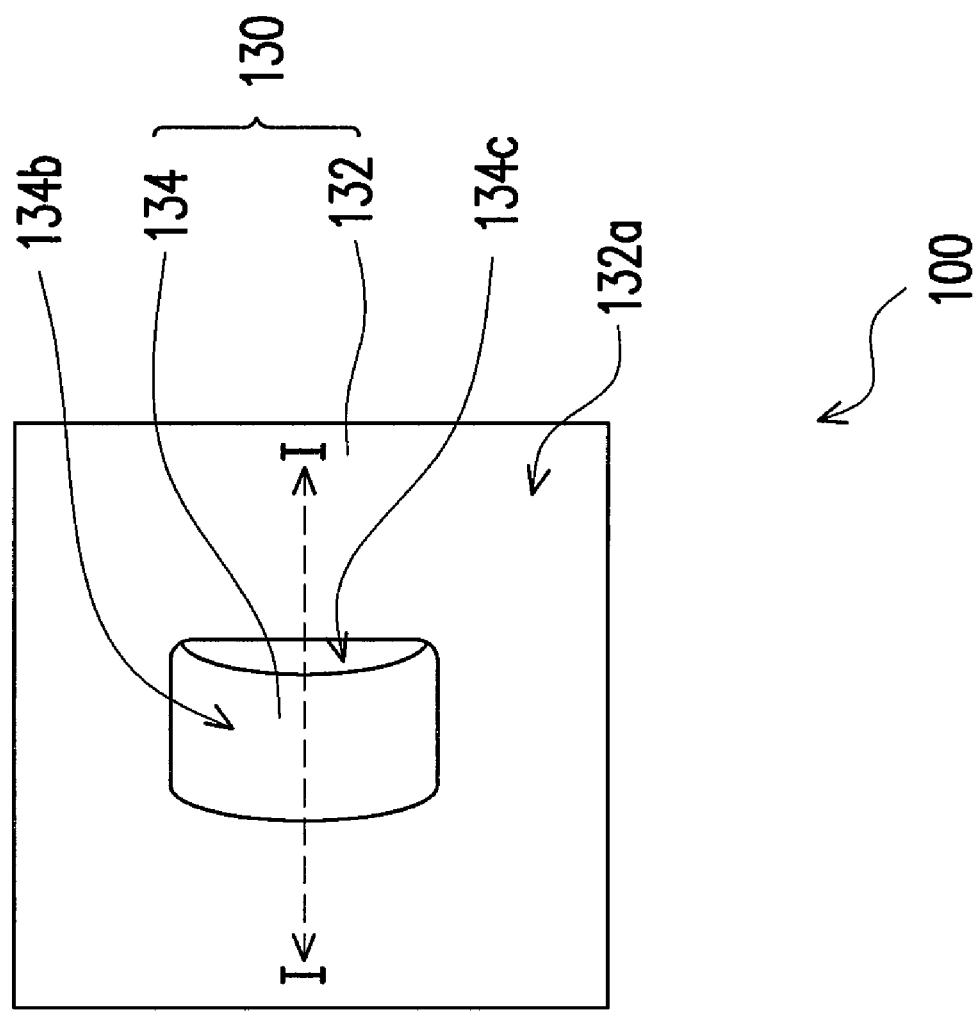
FIG. 1A is a schematic top view of a light emitting device according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

Figure 1B:
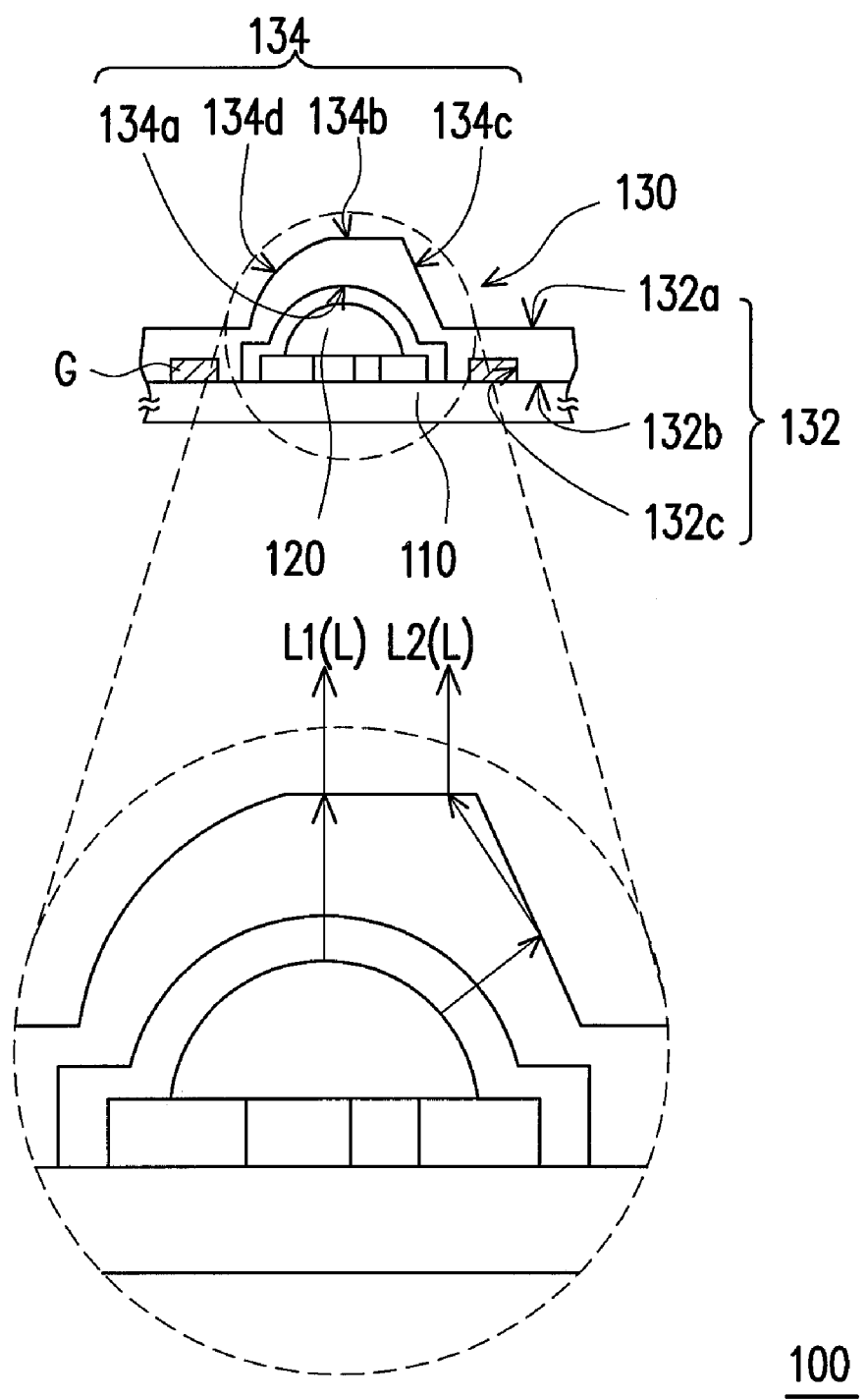
FIG. 1B is a schematic side view taken along line I-I in FIG. 1A.
Figure 1C:
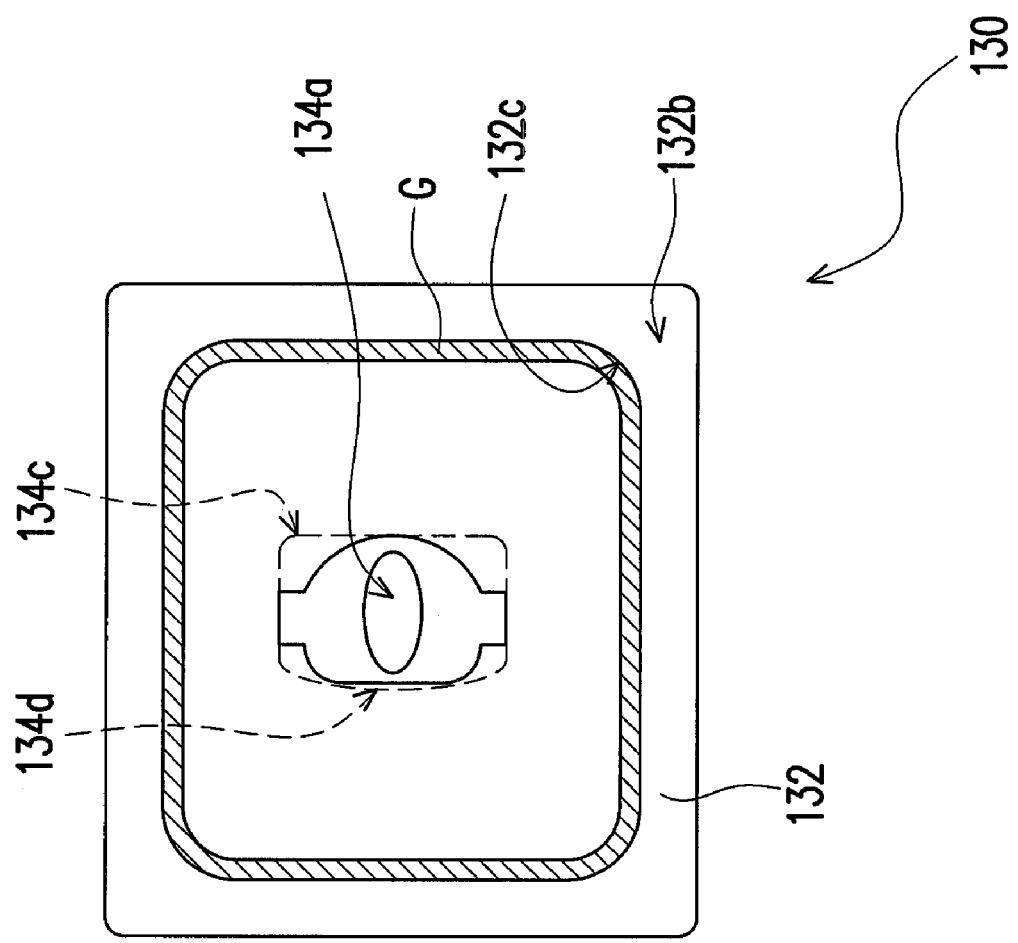
FIG. 1C is a schematic back-side view of the transparent plate depicted in FIG. 1A.

FIG. 1A is a schematic top view of a light emitting device according to an embodiment of the invention. FIG. 1B is a schematic side view taken along line I-I in FIG. 1A. FIG. 1C is a schematic back-side view of the transparent plate depicted in FIG. 1A. Referring to FIG. 1A, FIG. 1B, and FIG. 1C simultaneously, in the present embodiment, a light emitting device 100 includes a carrier 110, a light emitting element 120, and a transparent plate 130.

In details, the light emitting element 120 is disposed and electrically connected to the carrier 110. In the present embodiment, the light emitting element 120 is a light emitting diode (LED), and more specifically, this LED is a surface mount device (SMD) LED.

The transparent plate 130 is disposed on the carrier 110 and covers the light emitting element 120. Moreover, the transparent plate 130 includes a flat-portion 132 and a lens-portion 134, which is connected to the flat-portion 132. The flat-portion 132 has an upper surface 132a, a lower surface 132b that is opposite to the upper surface 132a, and a recess 132c, which is disposed around the lower surface 132b. Herein, the lower surface 132b of the flat-portion 132 is tightly adhered on the carrier 110, and the recess 132c is circularly disposed around the light emitting element 120. Moreover, the lens-portion 134 includes a light incident surface 134a, a light emitting surface 134b that is relative to the light incident surface 134a, and a first side surface 134c and a second side surface 134d that are connecting the upper surface 132a and the light emitting surface 134b. The light incident surface 134a is a curved surface concaving towards the light emitting surface 134b. In addition, the first side surface 134c is a plane and the second side surface 134d is a curved surface.

In the present embodiment, the light emitting element 120 is adapted to emit a light beam L. Moreover, a first partial beam L1 of the light beam L passes through the light incident surface 134a and emerges from the light emitting surface 134b. A second partial beam L2 of the light beam L passes through the light incident surface 134a and is transmitted to the first side surface 134c or the second side surface 134d. The first side surface 134c or the second side surface 134d is adapted to reflect at least a part of the second partial beam L2 of the light beam L to be passed through the light emitting surface 134b. In other words, after the second partial beam L2 enters the lens-portion 134 through the light incident surface 134a, a part of the second partial beam L2 is reflected by the first side surface 134c or the second side surface 134d, and passes through the light emitting surface 134b. However, another part of the second partial beam L2 is refracted and passes through the light emitting surface 134b. The first side surface 134c or the second side surface 134d reflects a part of the second partial beam L2 of the light beam L to change a transmission path of a part of the second partial beam L2. Therefore, a part of the second partial beam L2 that has been reflected by the first side surface 134c or the second side surface 134d focuses and emerges from the lens-portion 134.

Moreover, the flat-portion 132 of the transparent plate 130 of the present embodiment includes the recess 132c. The recess 132c is filled with a waterproof gel layer G for achieving a waterproof effect, so that electronic elements on the light emitting element 120 and the carrier 110 are prevented from being damaged by water, and the electrical quality of the light emitting device 100 can be ensured.

It should be noted that in the present embodiment, a material of the transparent plate 130 is polymethyl methacrylate (PMMA), which has transparency. Moreover, the transparent plate 130 can be adhered on the carrier 110 through adhesion, but the present embodiment is not limited herein. In other embodiment, the transparent plate 130 can also be disposed on the carrier 110 through screwing (not shown) or locking (not shown).

In brief, in the present embodiment, the first partial beam L1 of the light beam L that is emitted by the light emitting element 120 passes through the light incident surface 134a and the light emitting surface 134b sequentially to be transmitted to the external environment. On the other hand, the second partial beam L2 of the light beam L passes through the light incident surface 134a, and is transmitted to the first side surface 134c or the second side surface 134d. The first side surface 134c or the second side surface 134d is adapted to reflect at least a part of the second partial beam L2 to be passed through the light emitting surface 134b and transmitted to the external environment. In the process, a curvature of the light emitting surface 134b and a curvature of the light incident surface 134a of the transparent plate 130 are different. In addition, the first side surface 134c or the second side surface 134d allows a part of the second partial beam L2 to focus. Therefore, when the light beam L, which is emitted by the light emitting element 120, passes the secondary optical effect of the transparent plate 130 and is transmitted to the external environment, not only are the light emitting efficiency and light intensity of the light emitting device 100 enhanced, but the light emitting uniformity thereof is also enhanced. Additionally, the transparent plate 130 further controls the illuminance distribution of the light emitting element 120 while preventing the occurrence of glares and double visions, so that the light emitting device 100 can obtain a better illumination effect.

Figure 1D:
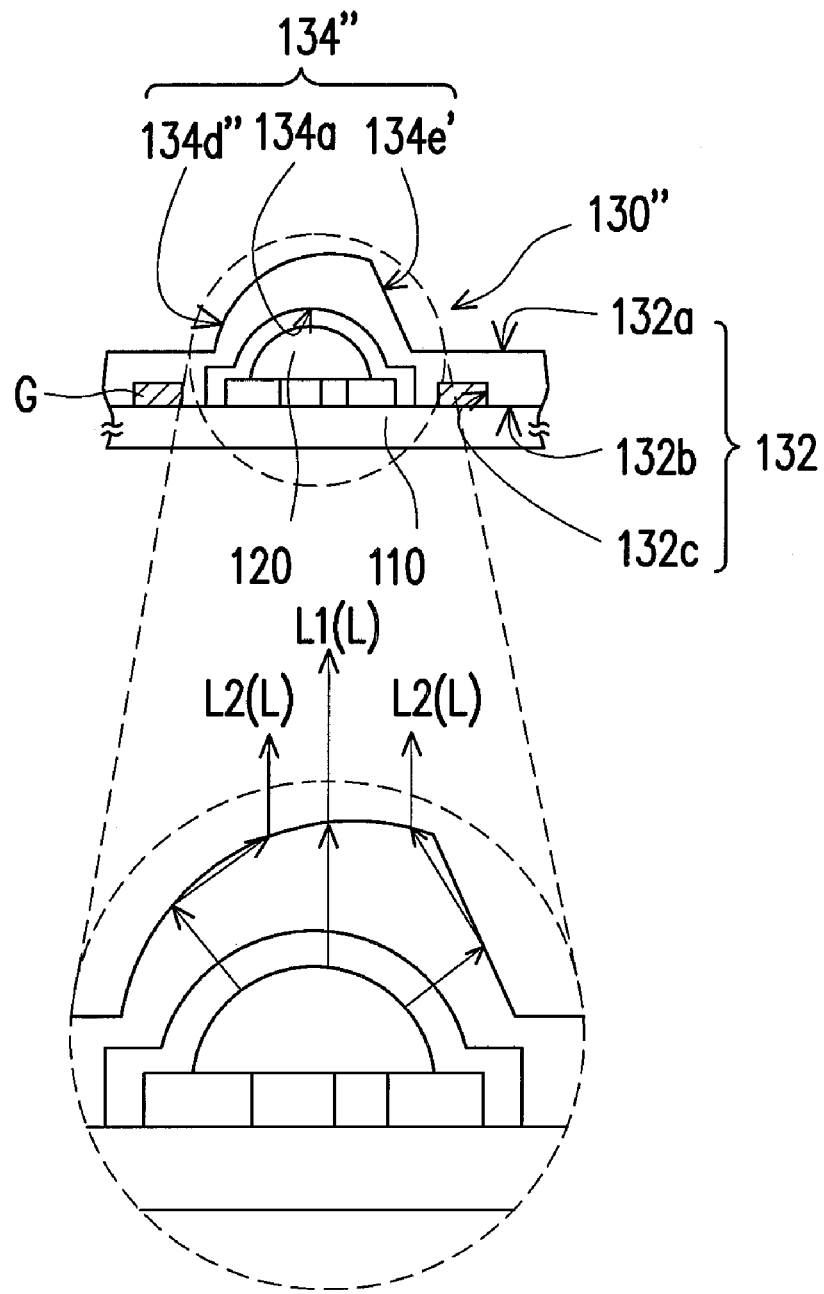
FIG. 1D is a schematic side view of a light emitting device according to another embodiment of the invention.

It should be noted that in other embodiments, as illustrated in FIG. 1D, a lens-portion 134″ includes a light incident surface 134a, and an outer curved surface 134d‴ and a side surface 134e′ that are connected to a upper surface 132a. Here, a curvature of the outer curved surface 134d‴ and a curvature of the light incident surface 134a are substantially different. Specifically, the lens-portion 134″ of a transparent plate 130″ in the present embodiment applies an optical simulation method to design the curvatures of the outer curved surface 134d‴ and the light incident surface 134a. Thus, in the process of the light beam L, which is emitted by a light emitting element 120, to pass through the light incident surface 134a and the outer curved surface 134d‴, as the light incident surface 134a and the outer curved surface 134d‴ have curvatures that are substantially different, the light emission uniformity of the light emitting element 120 can be enhanced. Furthermore, as the transparent plate 130″ includes the side surface 134e′, a light emitting device 100″ not only controls the illuminance distribution of the light emitting element 120 through the side surface 134e′, but also increases the light emitting quantity of the light emitting element 120 to enhance the light emitting efficiency of the light emitting element 120 and thereby enhancing the light emitting brightness of a light emitting device 100″. Furthermore, the occurrence of glares and double visions is prevented for the light emitting device 100″ to obtain a better illumination effect.

Figure 2A:
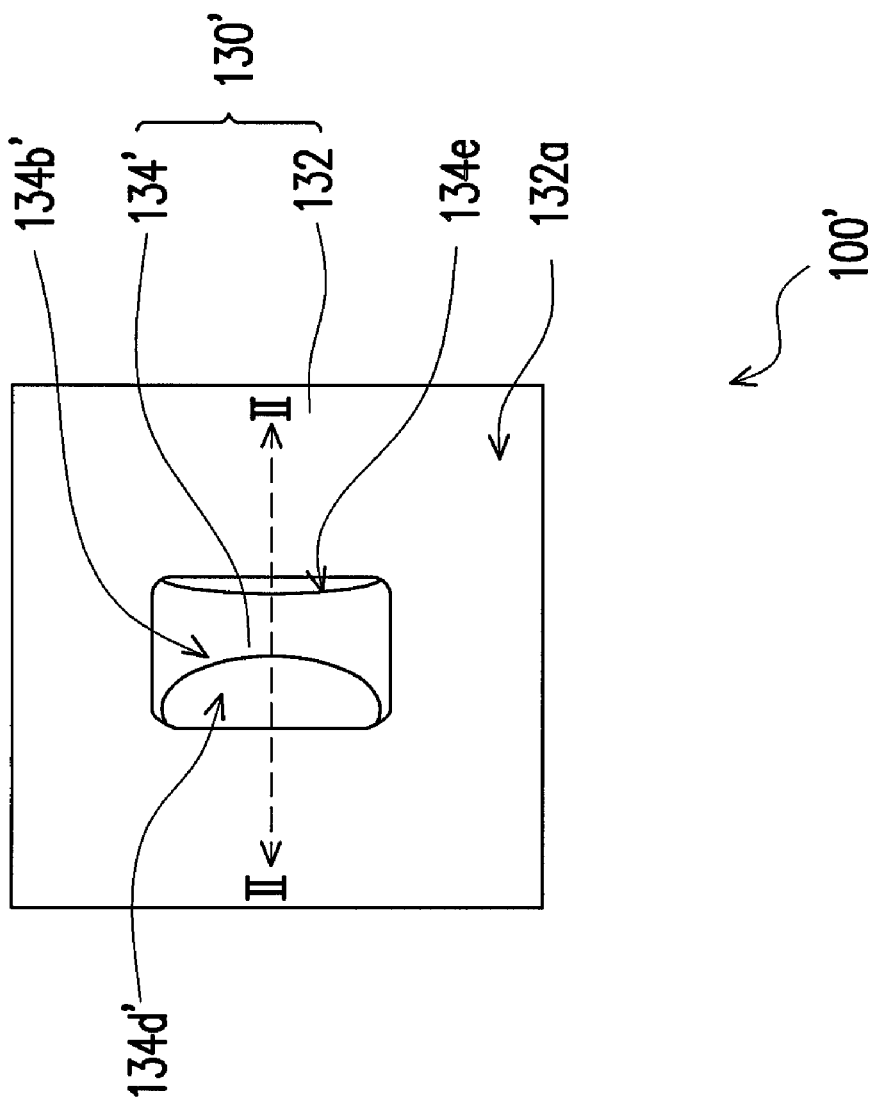
FIG. 2A is a schematic top view of a light emitting device according to another embodiment of the invention.
Figure 2B:
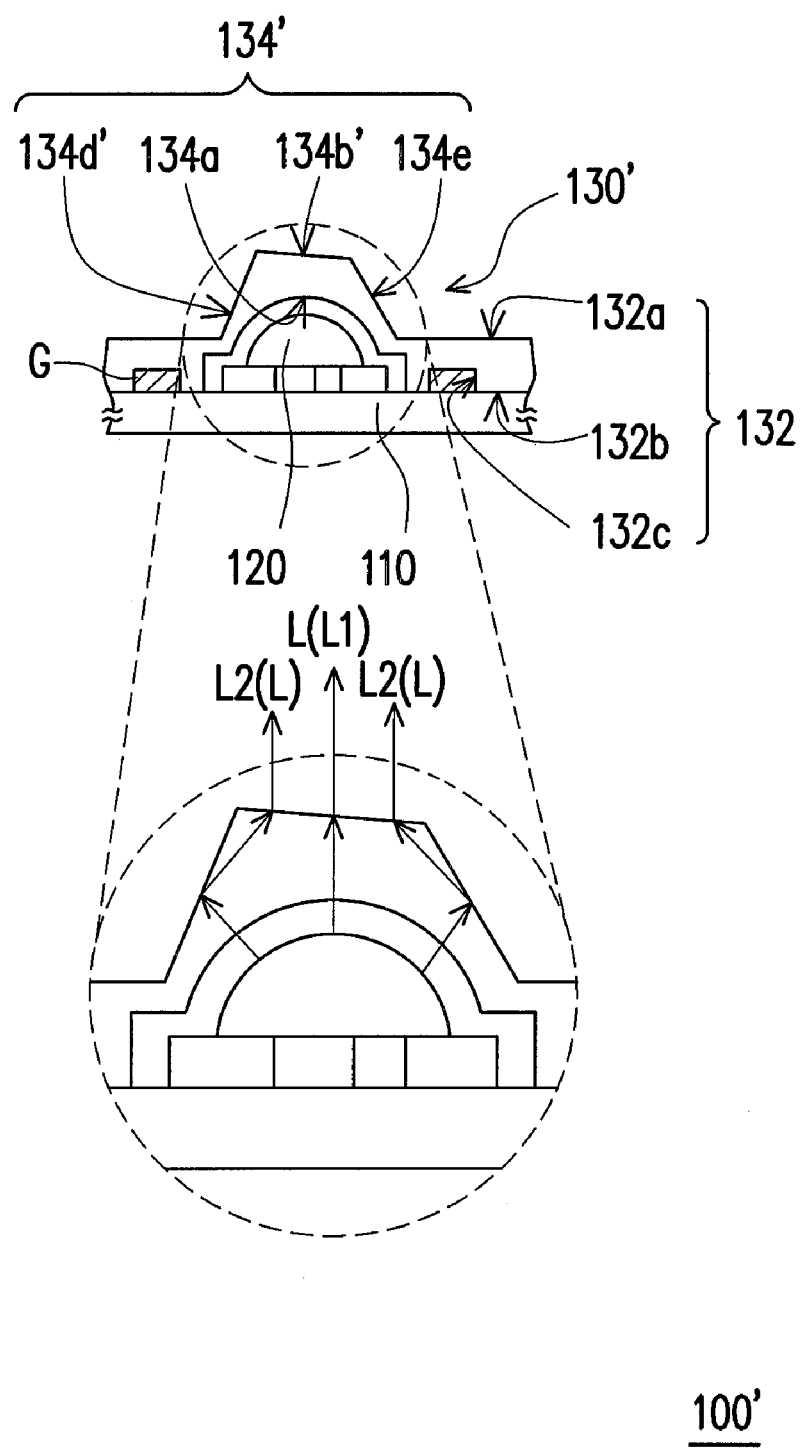
FIG. 2B is a schematic side view taken along line II-II in FIG. 2A.
Figure 2C:
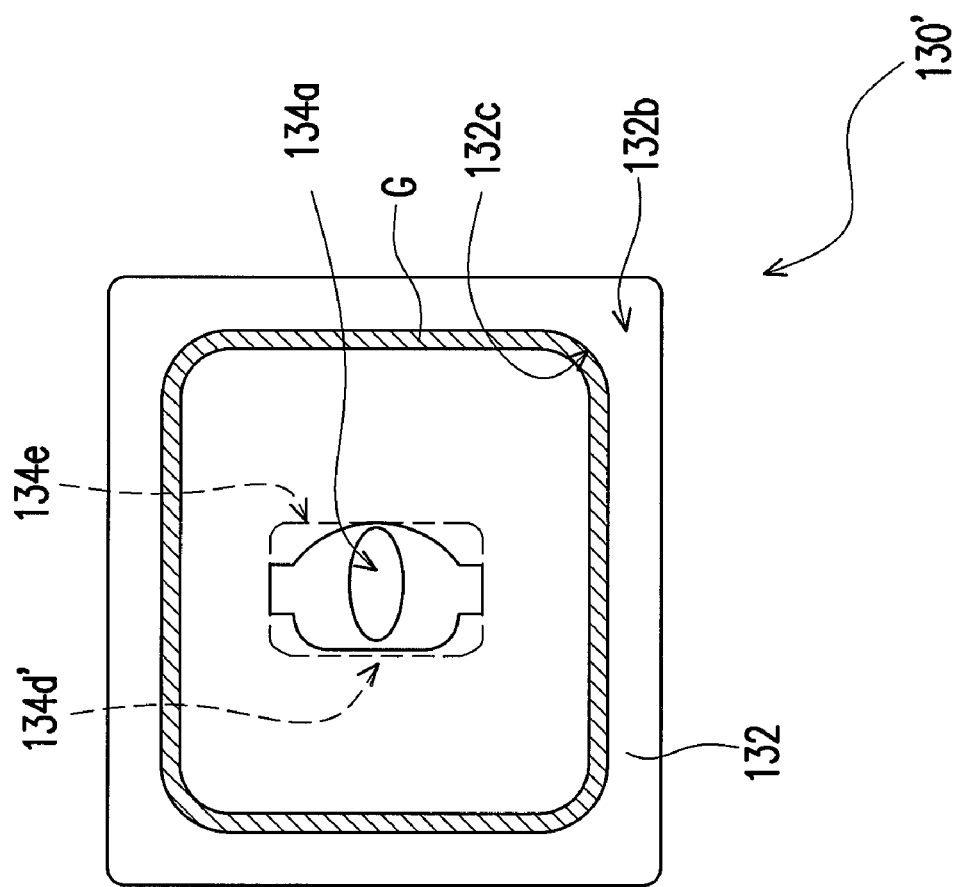
FIG. 2C is a schematic back-side view of the transparent plate depicted in FIG. 2A.

FIG. 2A is a schematic top view of a light emitting device according to another embodiment of the invention. FIG. 2B is a schematic side view taken along line II-II in FIG. 2A. FIG. 2C is a schematic back-side view of the transparent plate depicted in FIG. 2A. Referring to FIG. 2A, FIG. 2B, and FIG. 2C simultaneously, in the present embodiment, a light emitting device 100′ in FIG. 2A is similar to the light emitting device 100 in FIG. 1A. However, the main difference between the two is that in a transparent plate 130′ of the light emitting device 100′ in FIG. 2A, a transparent portion 134′ thereof includes a light emitting surface 134b′ which is relative to a light incident surface 134a, and a first side surface 134e and a second side surface 134d′ that are opposite to each other and connecting a upper surface 132a and the light emitting surface 134b′. Herein, the first side surface 134d′ and the second side surface 134e are each a plane, and the light incident surface 134a is a curved surface concaving towards the light emitting surface 134b′.

In details, tilting angles of the first side surface 134e and the second side surface 134d′ relative to the upper surface 132a are substantially different. In other words, a slope of the first side surface 134e and a slope of the second side surface 134d′ are different, but the present embodiment is not limited thereto. Obviously, in other embodiments that are not shown, the slopes of the first side surface 134e and the second side surface 134d′ can also be the same. In the present embodiment, the light emitting element 120 is adapted to emit a light beam L. Moreover, a first partial beam L1 of the light beam L passes through the light incident surface 134a and is refracted from the light emitting surface 134b′. A second partial beam L2 of the light beam L passes through the light incident surface 134a and is transmitted to the first side surface 134e or the second side surface 134d′. The first side surface 134e or the second side surface 134d′ reflects at least a part of the second partial beam L2 of the light beam L to be passed through the light emitting surface 134b′.

It should be illustrated that the slopes of the first side surface 134e and the second side surface 134d′ are different. Moreover, the first side surface 134e and the second side surface 134d′ are used to reflect a part of the second partial beam L2 of the light beam L for changing a transmission path of a part of the second partial beam L2. Hence, a part of the partial beam L2 that is reflected by the first side surface 134e and the second side surface 134d′ then focuses. Furthermore, the light emitting device 100′ controls the illuminance distribution of the light emitting element 120 through the first side surface 134e and the second side surface 134d′. At the same time, the occurrence of glares and double visions is prevented so that the light emitting device 100′ can obtain a better illumination effect.

Besides, in the present embodiment, the lens-portion 134′ applies the optical simulation method to design the curvatures of the light emitting surface 134b′ and the light incident surface 134a. Therefore, when the light beam L, which is emitted by the light emitting element 120, passes through the secondary optical effect of the light incident surface 134a and the light emitting surface 134b′ of the transparent plate 130′, and is transmitted to the external environment, not only is the light emitting quantity of the light emitting element 120 increased to enhance the light emitting efficiency thereof, but the light emitting intensity and light uniformity of the light emitting device 100′ can also be enhanced for the light emitting device 100′ to obtain a better illumination effect.

Figure 3A:
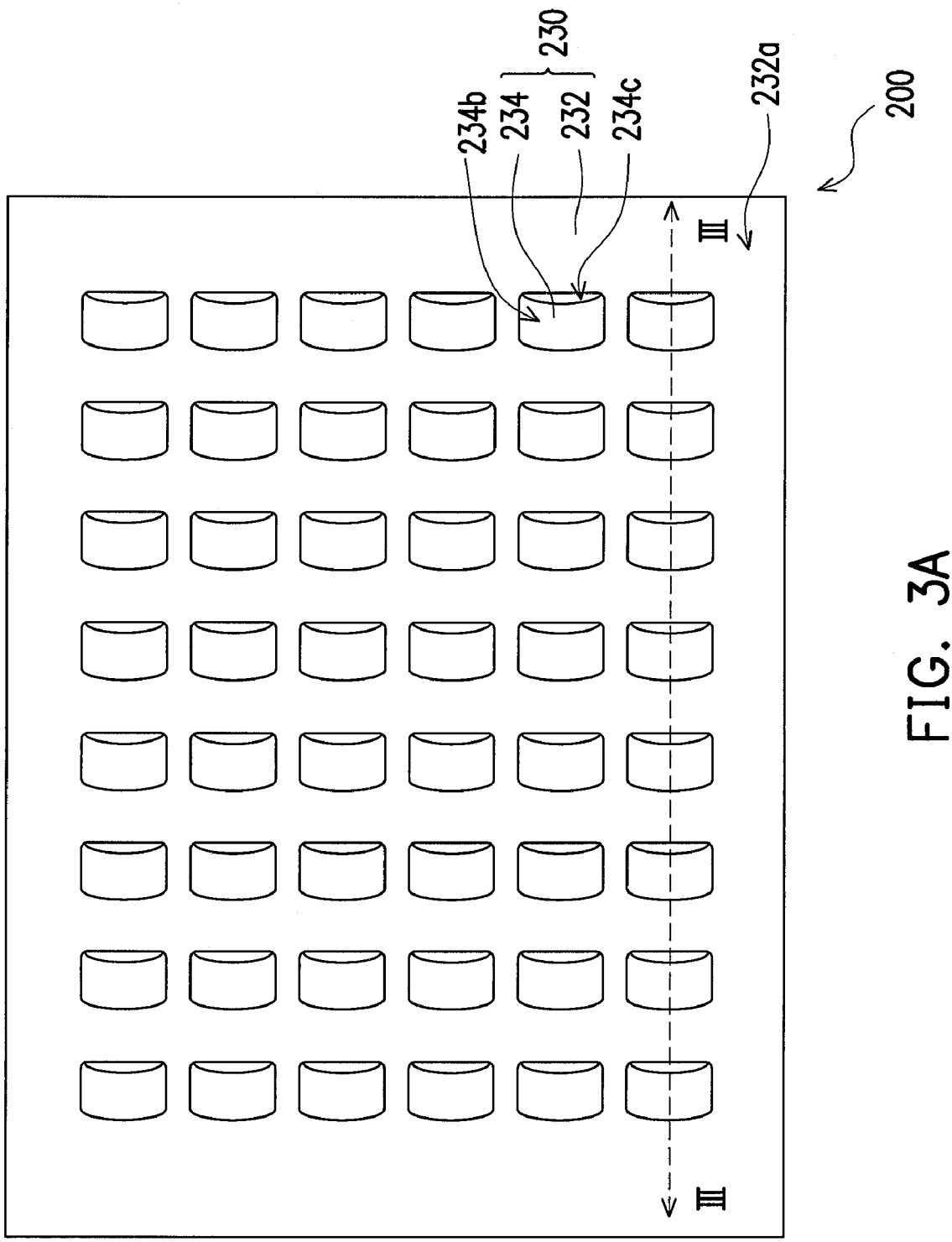
FIG. 3A is a schematic top view of a light source module according to an embodiment of the invention.
Figure 3B:
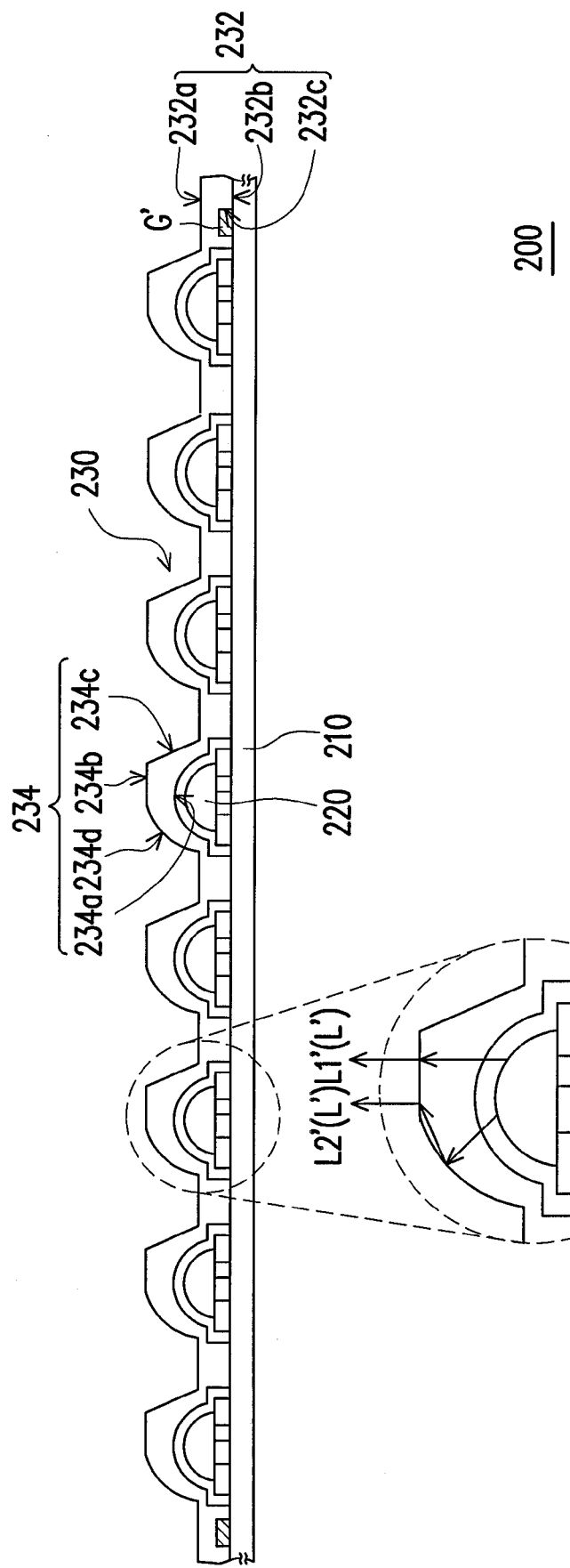
FIG. 3B is a schematic side view taken along line in FIG. 3A.
Figure 3C:
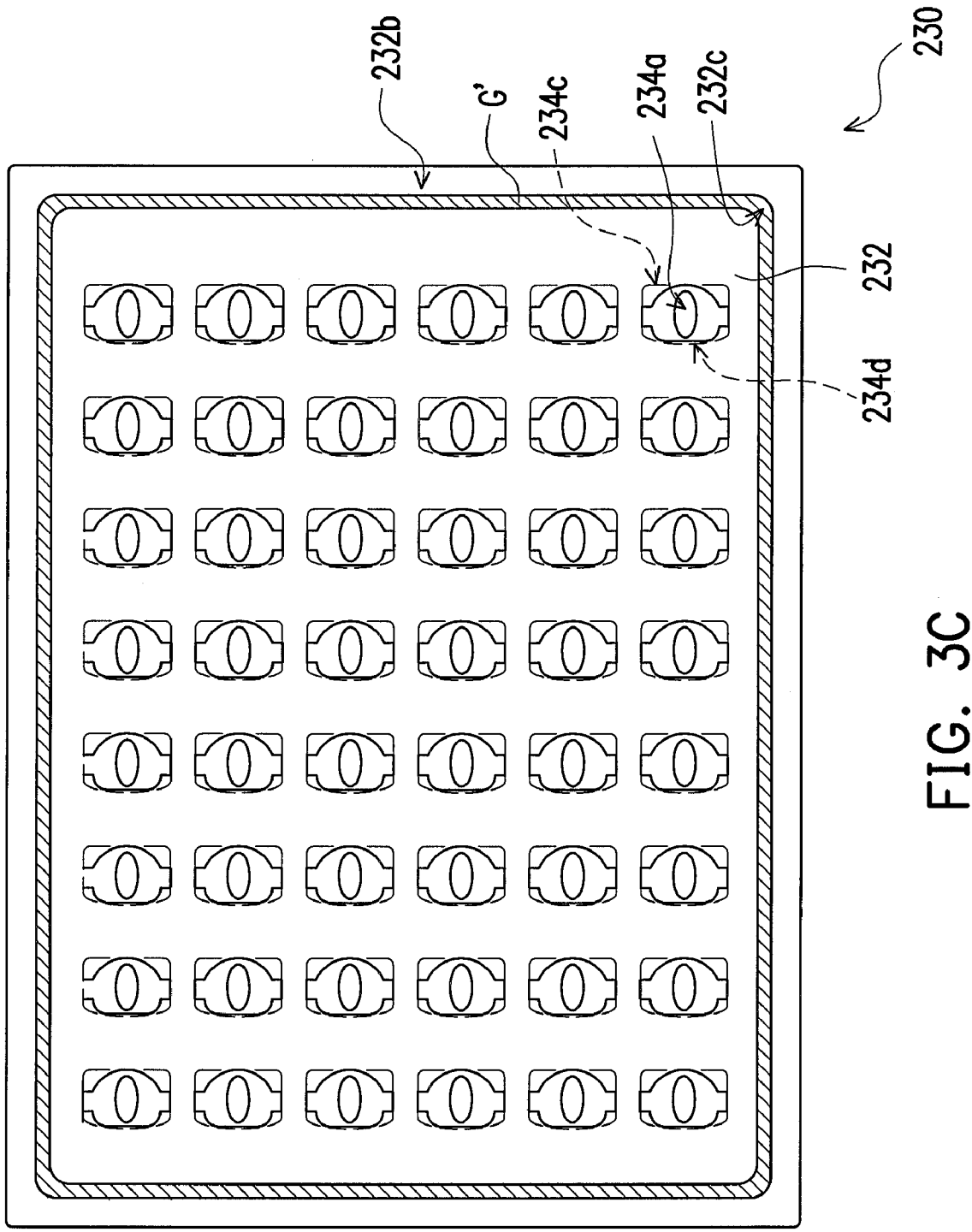
FIG. 3C is a schematic back-side view of the transparent plate depicted in FIG. 3A.
Figure 3D:
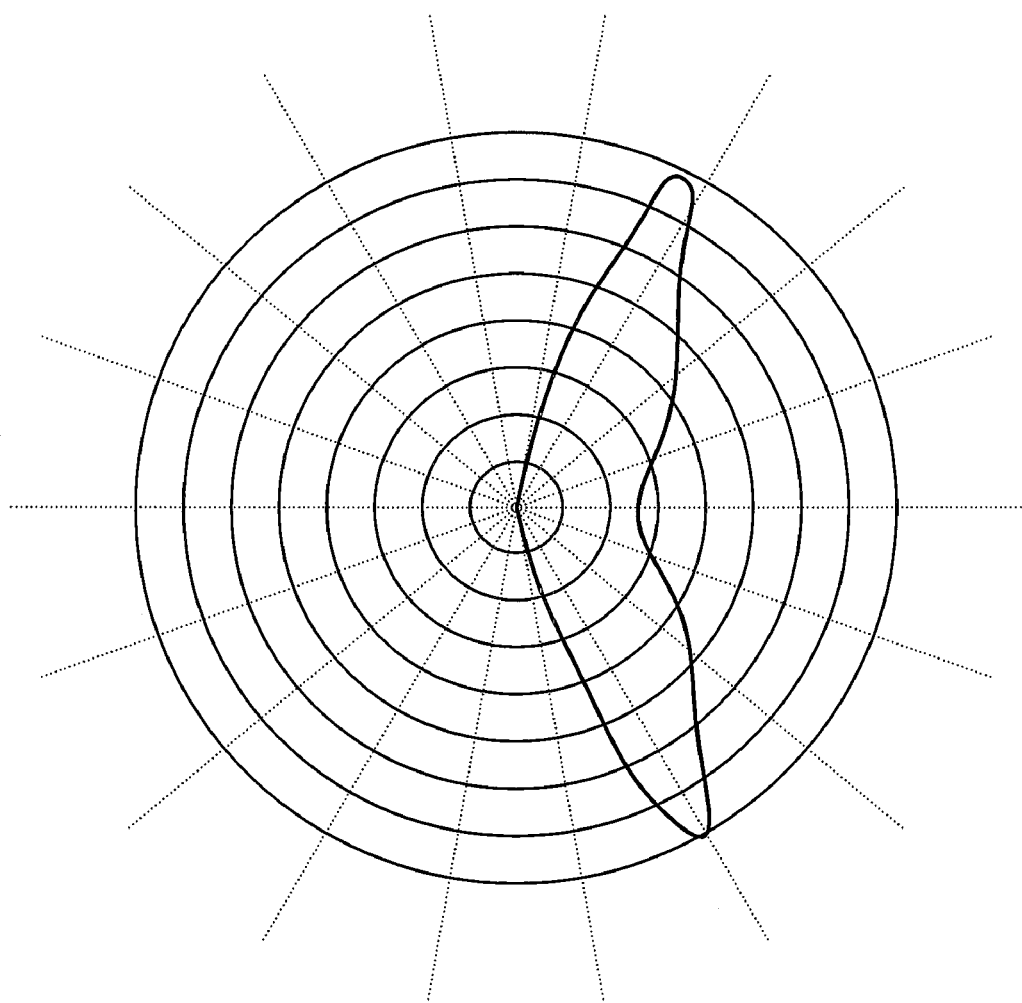
FIG. 3D is a schematic diagram of the light intensity distribution of the light source module depicted in FIG. 3A.

FIG. 3A is a schematic top view of a light source module according to an embodiment of the invention. FIG. 3B is a schematic side view taken along line III-III in FIG. 3A. FIG. 3C is a schematic back-side view of the transparent plate depicted in FIG. 3A. FIG. 3D is a schematic diagram of the light intensity distribution of the light source module depicted in FIG. 3A. Referring to FIG. 3A, FIG. 3B, and FIG. 3C simultaneously, in the present embodiment, a light source module 200 includes a carrier 210, a plurality of light emitting elements 220, and a transparent plate 230.

In details, the light emitting elements 220 are disposed and electrically connected to the carrier 210. Specially, in the present embodiment, the light emitting elements 220 are arranged on the carrier 210 in a manner of an 8×6 area array. Moreover, the light emitting elements 220 are a plurality of SMD LEDs.

The transparent plate 230 is disposed on the carrier 210. In addition, the transparent plate 230 includes a flat-portion 232 and a plurality of lens-portions 234, which is connected to the flat-portion 232. The flat-portion 232 includes an upper surface 232a, a lower surface 232b that is relative to the upper surface 232a, and a recess 232c, which is disposed around the lower surface 232b. Herein, the lower surface 232b of the flat-portion 232 is tightly adhered on the carrier 210, and the recess 232c is circularly disposed around the light emitting elements 220. The lens-portions 234 cover the light emitting elements 220 respectively, that is, the lens-portions 234 are also arranged in the manner of an 8×6 area array. More specifically, every lens-portion 234 has a light incident surface 234a, a light emitting surface 234b that is relative to the light incident surface 234a, and a first side surface 234c and a second side surface 234d which are connected to the upper surface 232a. Herein, the first side surface 234c and the second side surface 234d are respectively a plane and a curved surface. The light incident surface 234a is a curved surface concaving towards the light emitting surface 234b.

In the present embodiment, each light emitting element 220 is adapted to emit a light beam L'. Moreover, a first partial beam L1' of the light beam L' passes through the light incident surface 234a and emerges from the light emitting surface 234b. A second partial beam L2' of the light beam L' passes through the light incident surface 234a and is transmitted to the first side surface 234c or the second side surface 234d. The first side surface 234c or the second side surface 234d is adapted to reflect at least a part of the second partial beam L2' to be passed through the light emitting surface 234b. In other words, after the second partial beam L2' enters the lens-portion 234 through the light incident surface 234a, a part of the second partial beam L2' is reflected by the first side surface 234c or the second side surface 234d, and passes through the light emitting surface 234b. On the other hand, another part of the second partial beam L2' is refracted. The first side surface 234c or the second side surface 234d reflects a part of the second partial beam L2' of the light beam L' to change a transmission path of a part of the second partial beam L2'. Therefore, a part of the second partial beam L2' that has been reflected by the first side surface 234c or the second side surface 234d focuses.

Particularly, as every lens-portion 234 of the transparent plate 230 includes the first side surface 234c and the second side surface 234d, the light source module 200 not only controls the illuminance distribution and the light intensity distribution (refer to FIG. 3D) of the light emitting elements 220 through the first side surface 234c and the second side surface 234d, but also increases the light emitting quantity of the light emitting elements 220 to enhance the light emitting efficiency of the light emitting elements 220 and thereby enhancing the light emitting brightness of the light source module 200. Furthermore, the occurrence of glares and double visions is prevented for the light source module 200 to obtain a more uniformed planar light source for achieving a better illumination effect. Moreover, the flat-portion 232 of the transparent plate 230 of the present embodiment includes the recess 232c. The recess 232c is filled with a waterproof gel layer G' for achieving a waterproof effect, so that electronic elements on the light emitting elements 220 and the carrier 210 are prevented from being damaged by water, and the electrical quality of the light source module 200 can be ensured.

It should be noted that in the present embodiment, a material of the transparent plate 230 is PMMA, which includes transparency. Moreover, the transparent plate 230 can be adhered to the carrier 210 through adhesion, but the present embodiment is not limited herein. In other embodiments, the transparent plate 230 can also be disposed on the carrier 210 through screwing (not shown) or locking (not shown). Furthermore, it must be illustrated that the invention does not limit the number and the arranging manner of the light emitting elements 220. Although the light emitting elements 220 herein are specifically arranged in the manner of the 8×6 area array, however, in other embodiments, the number and the arranging manner of the light emitting elements 220 can be modified based on demand. That is, the number of the light emitting elements 220 may be increased or decreased, and the arranging manner may be altered to change the brightness of the planar light source and the light intensity distribution. The aforesaid method would still be a part of the technical proposal of the invention and not departing from the protection range of the invention.

In short, in the present embodiment, the first partial beams L1' of the light beams L' that are respectively emitted by the light emitting elements 220 pass through the light incident surface 234a and the light emitting surface 234b sequentially to be transmitted to the external environment. On the other hand, the second partial beams L2' of the light beams L' pass through the light incident surface 234a, and are transmitted to the first side surface 234c or the second side surface 234d. The first side surface 234c or the second side surface 234d is adapted to reflect at least a part of the second partial beam L2' to be passed through the light emitting surface 234b and transmitted to the external environment. In the process, a curvature of the light emitting surface 234b and a curvature of the light incident surface 234a are different. In addition, the first side surface 234c or the second side surface 234d allows a part of the second partial beam L2' to focus. Therefore, when the light beams L', which are emitted respectively by the light emitting elements 220, pass through the secondary optical effect of the transparent plate 230 and are transmitted to the external environment, not only are the light emitting efficiency and light intensity of the light source module 200 enhanced, but the light emitting uniformity of the light source module 200 is also enhanced. Additionally, the transparent plate 230 further controls the illuminance distribution and the light intensity distribution of the light emitting elements 220 while preventing the occurrence of glares and double visions, so that the light source module 200 can obtain a better illumination effect.

Figure 4A:
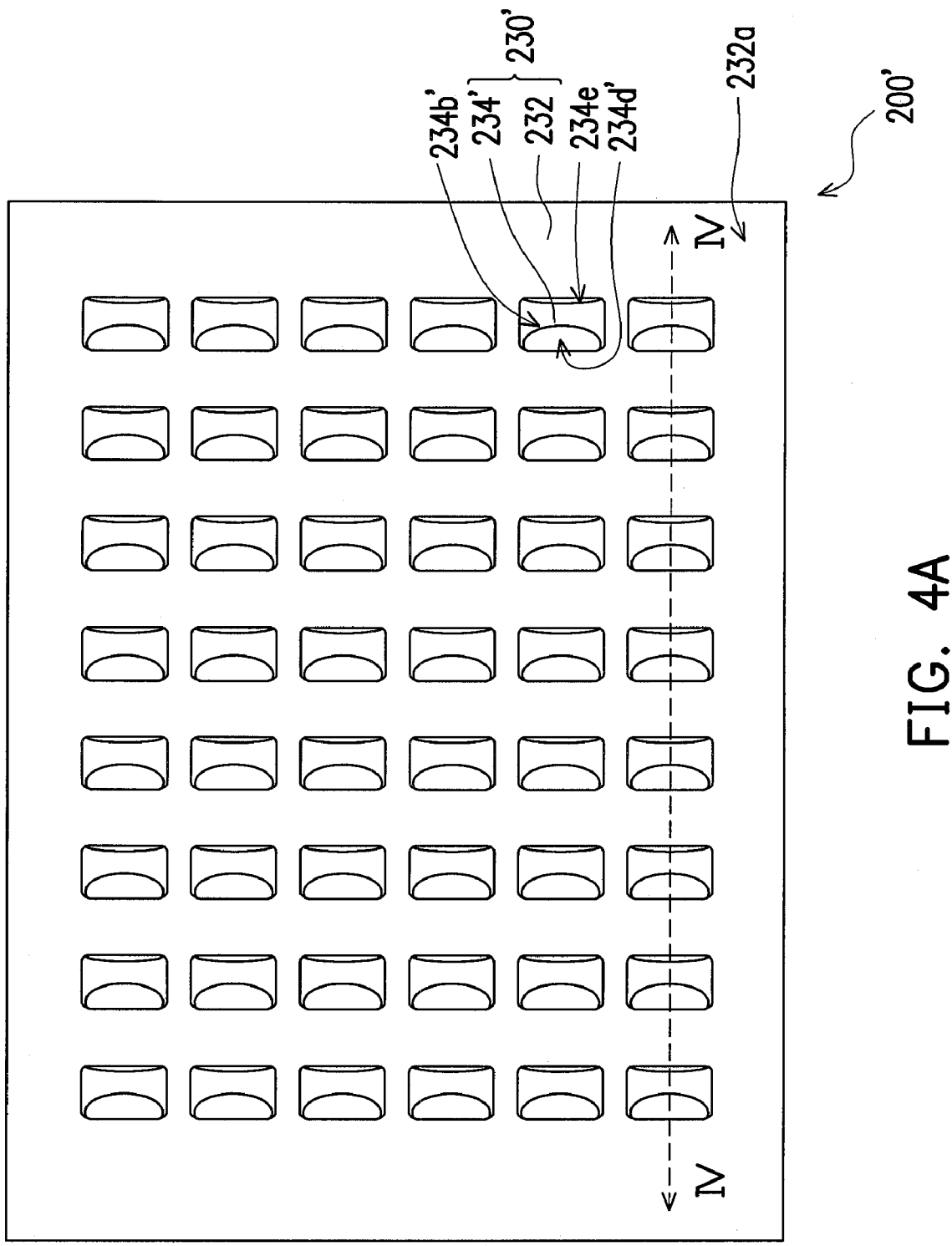
FIG. 4A is a schematic top view of a light source module according to another embodiment of the invention.
Figure 4B:
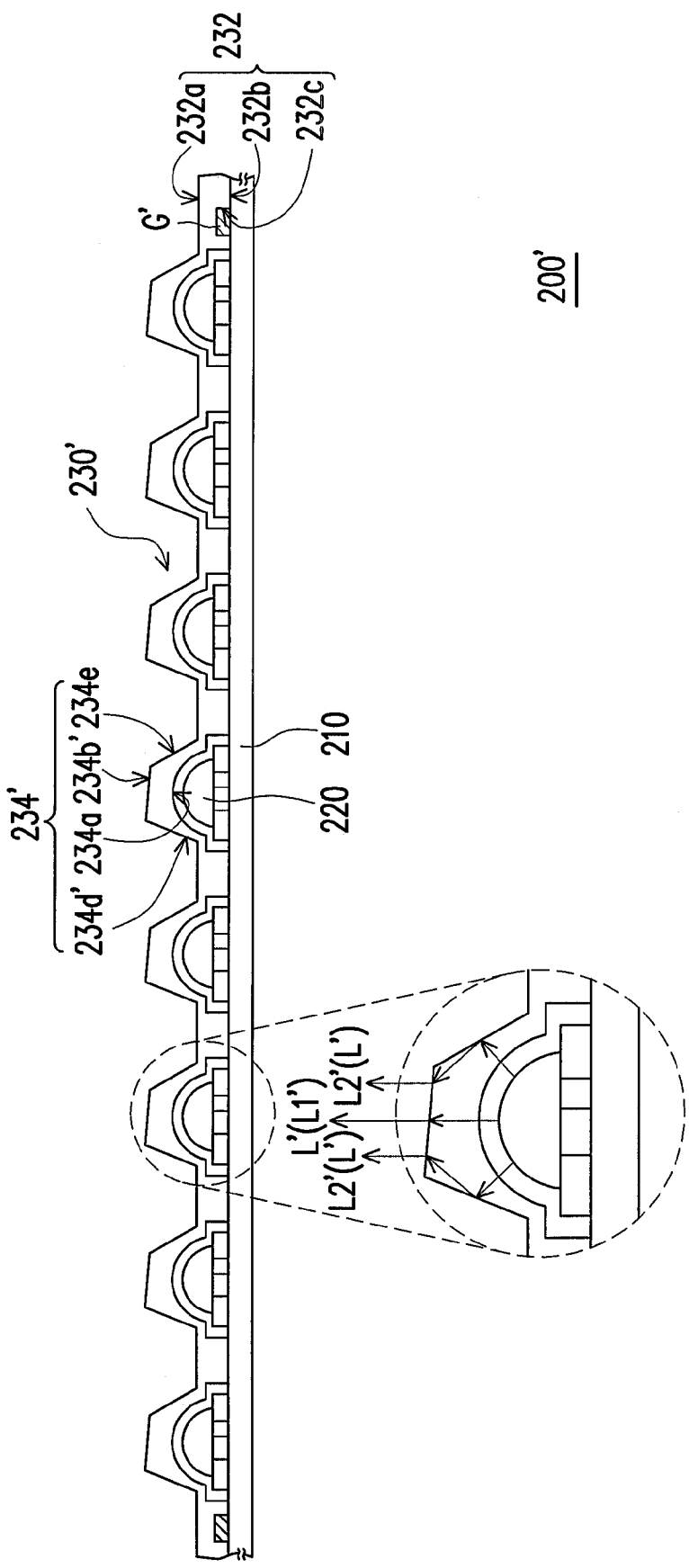
FIG. 4B is a schematic side view taken along line IV-IV in FIG. 4A.
Figure 4C:
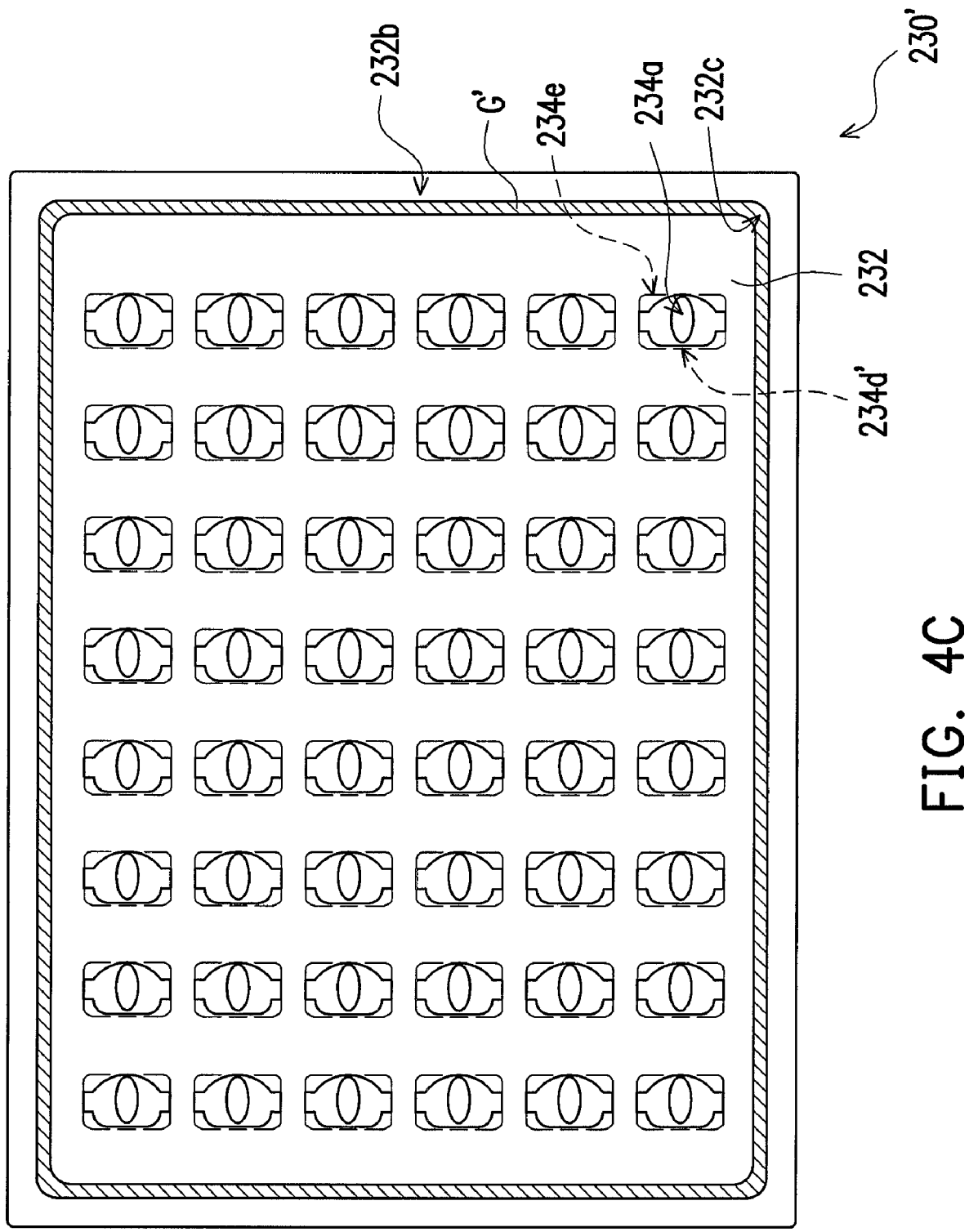
FIG. 4C is a schematic back-side view of the transparent plate depicted in FIG. 4A.
Figure 4D:
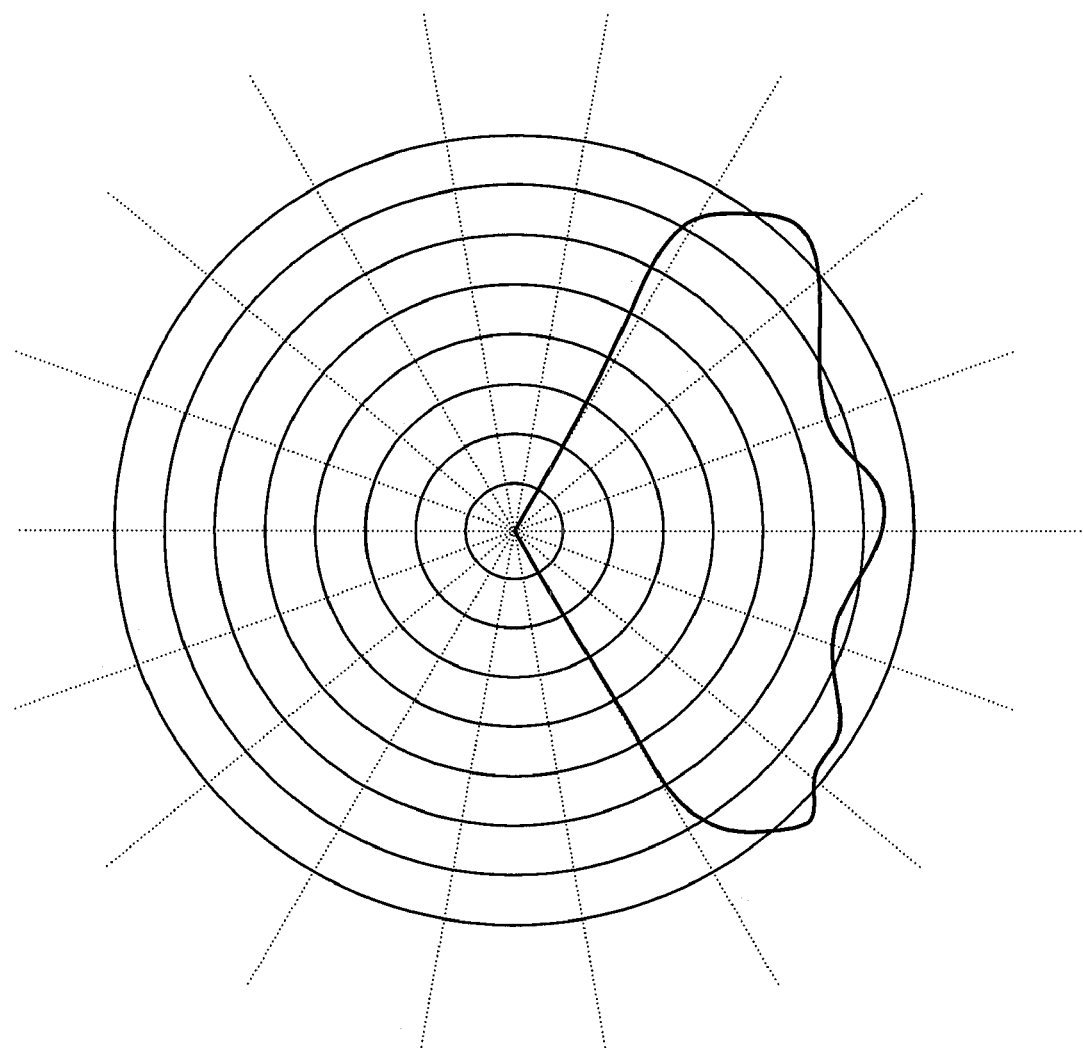
FIG. 4D is a schematic diagram of the light intensity distribution of the light source module depicted in FIG. 4A.

FIG. 4A is a schematic top view of a light source module according to another embodiment of the invention. FIG. 4B is a schematic side view taken along line IV-IV in FIG. 4A. FIG. 4C is a schematic back-side view of the transparent plate depicted in FIG. 4A. FIG. 4D is a schematic diagram of the light intensity distribution of the light source module depicted in FIG. 4A. Referring to FIG. 4A, FIG. 4B, and FIG. 4C simultaneously, in the present embodiment, a light source module 200' in FIG. 4A is similar to the light source module 200 in FIG. 2A. However, the main difference between the two is that in a transparent plate 230' of the light source module 200' in FIG. 4A, a lens-portion 234' thereof includes a light emitting surface 234b' relative to the light incident surface 234a, and a first side surface 234e and a second side surface 234d' that are opposite to each other and connecting the upper surface 232a and the light emitting surface 234b'. Herein, the first side surface 234e and the second side surface 234d' are each a plane, and the light incident surface 234a is a curved surface concaving towards the light emitting surface 234b'.

In more detail, tilting angles of the first side surface 234e and the second side surface 234d' relative to the upper surface 232a are substantially different. In other words, a slope of the first side surface 234e and a slope of the second side surface 234d' are different, but the present embodiment is not limited thereto. Obviously, in other embodiments, the slopes of the first side surface 234e and the second side surface 234d' can also be the same. In the present embodiment, each light emitting element 220 is adapted to emit a light beam L'. Moreover, a first partial beam L1' of the light beam L' passes through the light incident surface 234a and emerges from the light emitting surface 234b'. A second partial beam L2' of the light beam L' passes through the light incident surface 234a and is transmitted to the first side surface 234e or the second side surface 234d'. The first side surface 234e or the second side surface 234d' reflects at least a part of the second partial beam L2' to be passed through the light emitting surface 234b'.

The slopes of the first side surface 234e and the second side surface 234d' are different. Moreover, the first side surface 234e and the second side surface 234d' are used to reflect a part of the second partial beam L2' in the light beam L' for changing a transmission path a part of the second partial beam L2'. Hence, a part of the partial beam L2' that is reflected by the first side surface 234e and the second side surface 234d' then focuses. Additionally, the light source module 200' can control the illuminance distribution and the light intensity distribution (shown in FIG. 4D) of the light emitting elements 220 through the first side surface 234e and the second side surface 234d'. At the same time, the occurrence of glares and double visions is also prevented, so that the light source module 200' obtains a more uniformed planar light source for achieving a better illumination effect.

Besides, in the present embodiment, the lens-portion 234' applies the optical simulation method to design the curvatures of the light emitting surface 234b' and the light incident surface 234a. Therefore, when the light beams L', which are emitted by the light emitting elements 220, pass through the secondary optical effect of the light incident surface 234a and the light emitting surface 234b' of the transparent plate 230', and are transmitted to the external environment, not only is the light emitting quantity of the light emitting elements 220 increased to enhance the light emitting efficiency thereof, but the light emitting intensity and light uniformity of the light source module 200' can also be enhanced for the light source module 200' to obtain a better illumination effect.

Figure 5A:
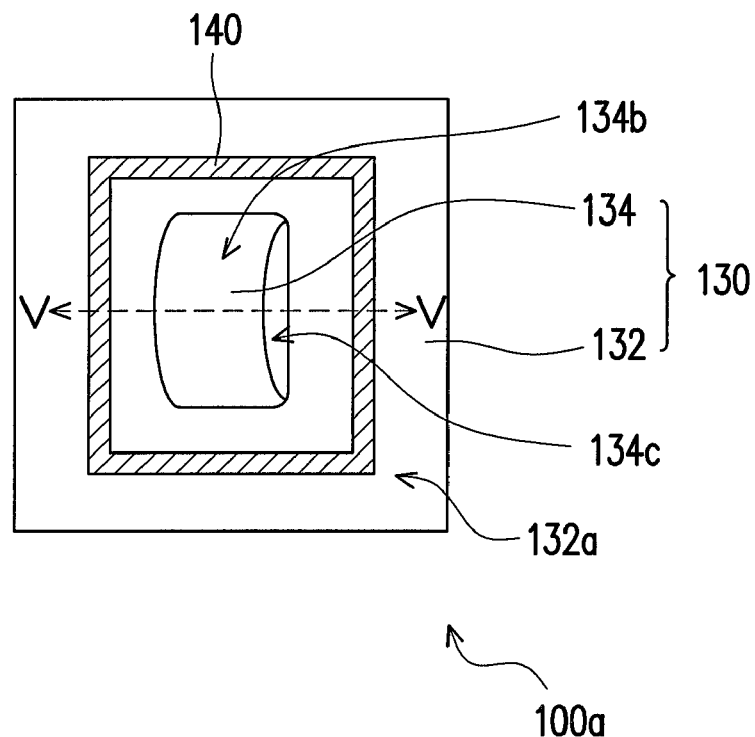
FIG. 5A is a schematic top view of a light emitting device according to another embodiment of the invention.
Figure 5B:
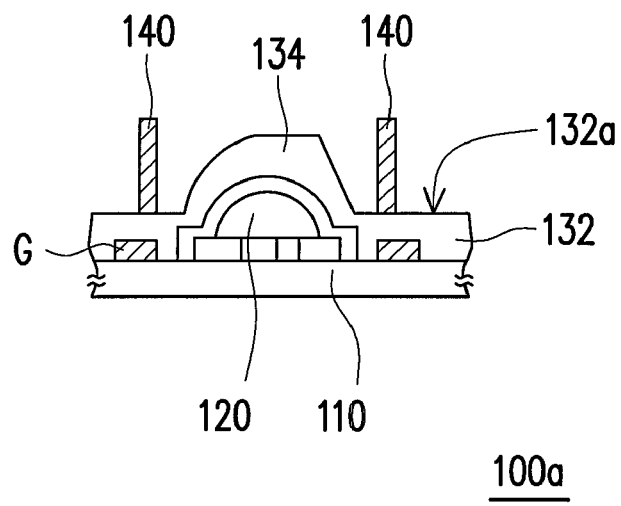
FIG. 5B is a schematic side view taken along line V-V in FIG. 5A.

FIG. 5A is a top schematic view of a light emitting device according to another embodiment of the invention. FIG. 5B is a schematic cross-sectional view taken along Line V-V in FIG. 5A. Referring to FIG. 5A and FIG. 5B, the light emitting device 100a of the present embodiment is similar to the light emitting device 100 in FIG. 1A, and the main difference therebetween is that the light emitting device 100a of the present embodiment further includes a light shielding side wall structure 140. The light shielding side wall structure 140 is disposed on the upper surface 132a of the flat-portion 132 and surrounds the lens-portion 134. In the present embodiment, the material of the light shielding side wall structure 140, for example, is metal, metal alloy, polymer plastic material, glass, or the combination thereof.

In the light emitting device 100a of the present embodiment, the light shielding side wall structure 140 is adopted to cut off or reflect a part of the light beam having the large emitting angle emitted from the lens-portion 134. Accordingly, the light emitting device 100a has a smaller emitting angle.

It should be noted that the light shielding side wall structure 140 is not limited to be applied to the structure of the light emitting device 100 in FIG. 1A to form the light emitting device of the present embodiment. In other embodiments, the light shielding side wall structure 140 may be applied to the structure of the light emitting device 100" in FIG. 1D or the structure of the light emitting device 100' in FIG. 2A.

Figure 6A:
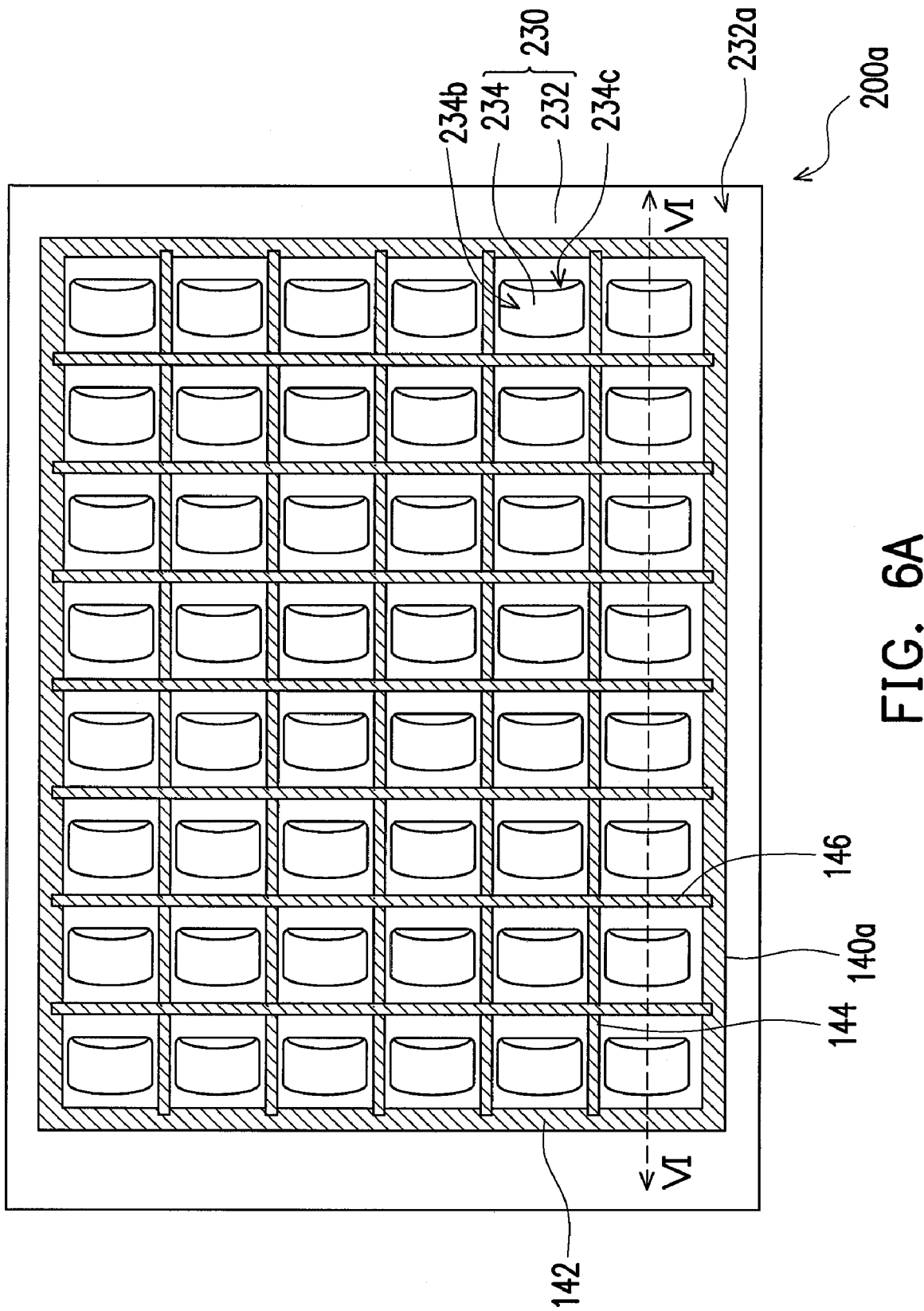
FIG. 6A is a schematic top view of a light emitting device according to another embodiment of the invention.
Figure 6B:
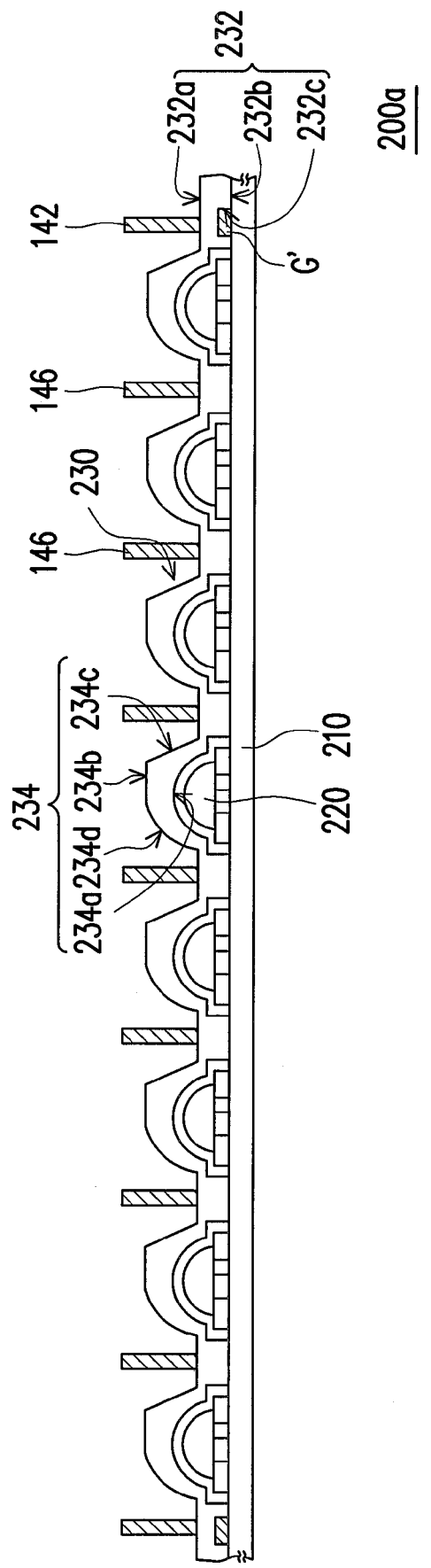
FIG. 6B is a schematic side view taken along line VI-VI in FIG. 6A.
Figure 6C:
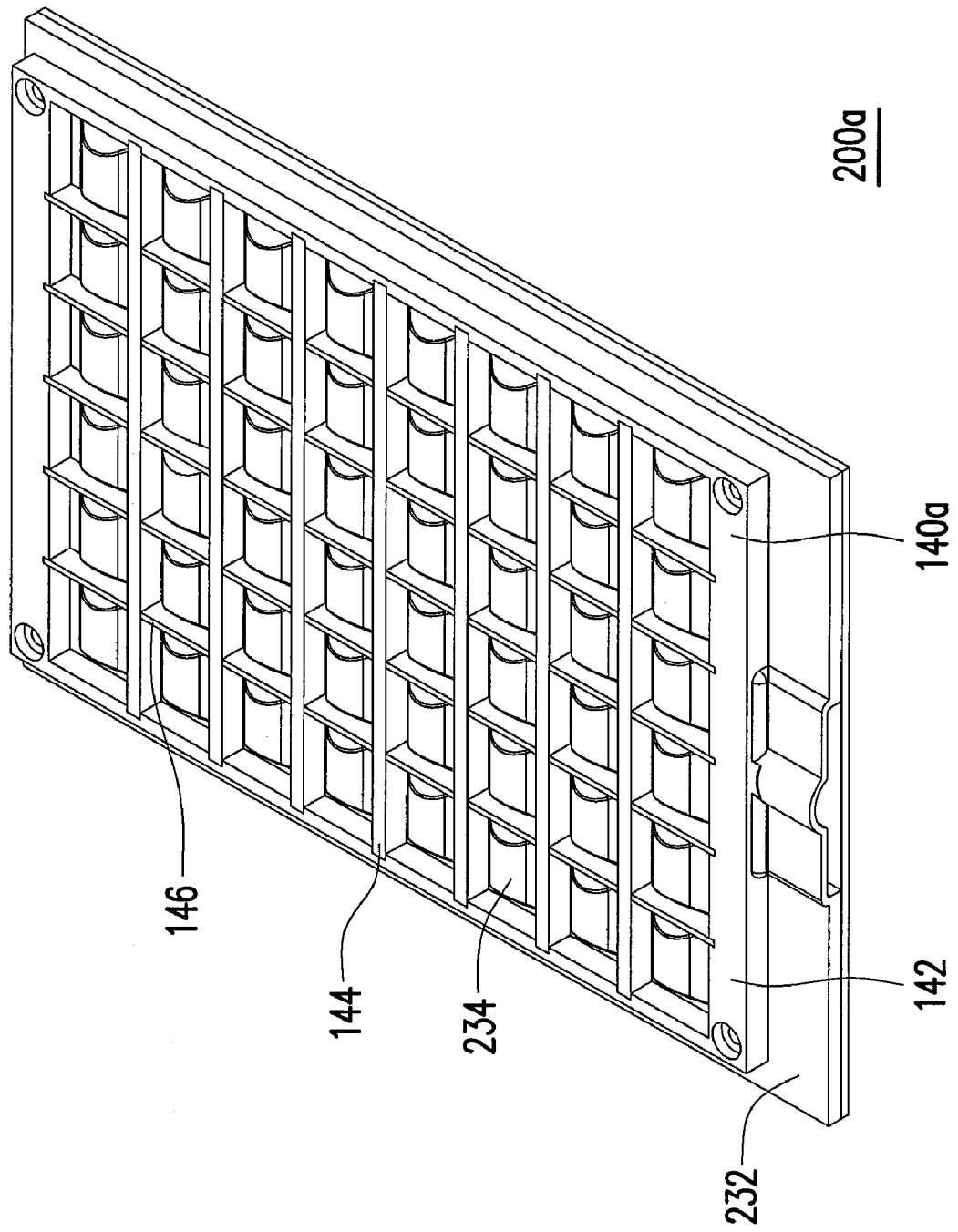
FIG. 6C is a perspective view of the light emitting device of FIG. 6A.

FIG. 6A is a top schematic view of a light emitting device according to another embodiment of the invention. FIG. 6B is a schematic cross-sectional view taken along Line VI-VI in FIG. 6A. FIG. 6C is a three-dimensional view of the light emitting device in FIG. 6A. Referring to FIGS. 6A-6C, the light emitting device 200a of the present embodiment is similar to the light source module 200 in FIG. 3A, and the main difference therebetween is that the light emitting device 200a of the present embodiment further includes a light shielding side wall structure 140a. The material of the light shielding side wall structure 140, for example, is metal, metal alloy, polymer plastic material, glass, or the combination thereof. In the present embodiment, these lens-portions 234 are aligned into a plurality of rows and a plurality of columns to form a two-dimensional array. The light shielding side wall structure 140a includes an outer reflective frame 142, a plurality of first reflective partition plates 144, and a plurality of second reflective partition plates 146. The outer reflective frame 142 is disposed on the upper surface 232a of the flat-portion 232 and surrounds these lens-portions 234. The first reflective partition plates 144 are disposed on the upper surface 232a of the flat-portion 232, wherein each of the first reflective partition plates 144 is disposed between the two neighboring columns. The second reflective partition plates 146 are disposed on the upper surface of the flat-portion 232, wherein each of the second reflective partition plates 146 is disposed between the two neighboring rows.

In the light emitting device 200a of the present embodiment, the light shielding side wall structure 140a is adopted to cut off or reflect a part of the light beam having the large emitting angle emitted from the lens-portion 234. Accordingly, the light emitting device 200a has a smaller emitting angle. Moreover, in the present embodiment, the first reflective partition plates 144, the second reflective partition plates 146, and the outer reflective frame 142 can be formed independently. As a result, the first reflective partition plates 144, the second reflective partition plates 146 can be detached from the outer reflective frame 142 or be assembled with the outer reflective frame 142. Accordingly, the structure of the light shielding side wall structure 140a is easy to be assembled and detached, so that the maintenance is easy. However, in other embodiments, the first reflective partition plates 144, the second reflective partition plates 146, and the outer reflective frame 142 may be integrally formed.

It should be noted that the light shielding side wall structure 140a is not limited to be applied to the structure of the light source module 200 in FIG. 3A to form the light emitting device 200a of the present embodiment. In other embodiments, the light shielding side wall structure 14a0 may be applied to the structure of the light source module 200' in FIG. 4A.

FIG. 7A is the light emitting intensity distribution of the light emitting device without the light shielding side wall structure and the transparent plate in FIG. 6A. FIG. 7B is the light emitting intensity distribution of the light emitting device in FIG. 6A. Referring to FIG. 7A and FIG. 7B, the radial coordinate represents the amount of the light emitting intensity, the angular coordinate represents the light emitting angle, and in these figures, the light emitting intensity distributions in the first direction and the second direction are both illustrated, wherein the first direction is the vertical direction in FIG. 6A, and the second direction is the horizontal direction in FIG. 6A. It is found by comparing FIG. 7A and FIG. 7B that, in FIG. 7A, the light emitting intensity in the second direction between the light emitting angles 30 degrees and 60 degrees is still larger than a specific value, but in FIG. 7A, the light emitting intensity in the second direction between the light emitting angles 30 degrees and 60 degrees is almost equal to zero. Accordingly, it is verified that the light shielding side wall structure 140a in FIG. 6A certainty reduces the light emitting angle.

Figure 8A:
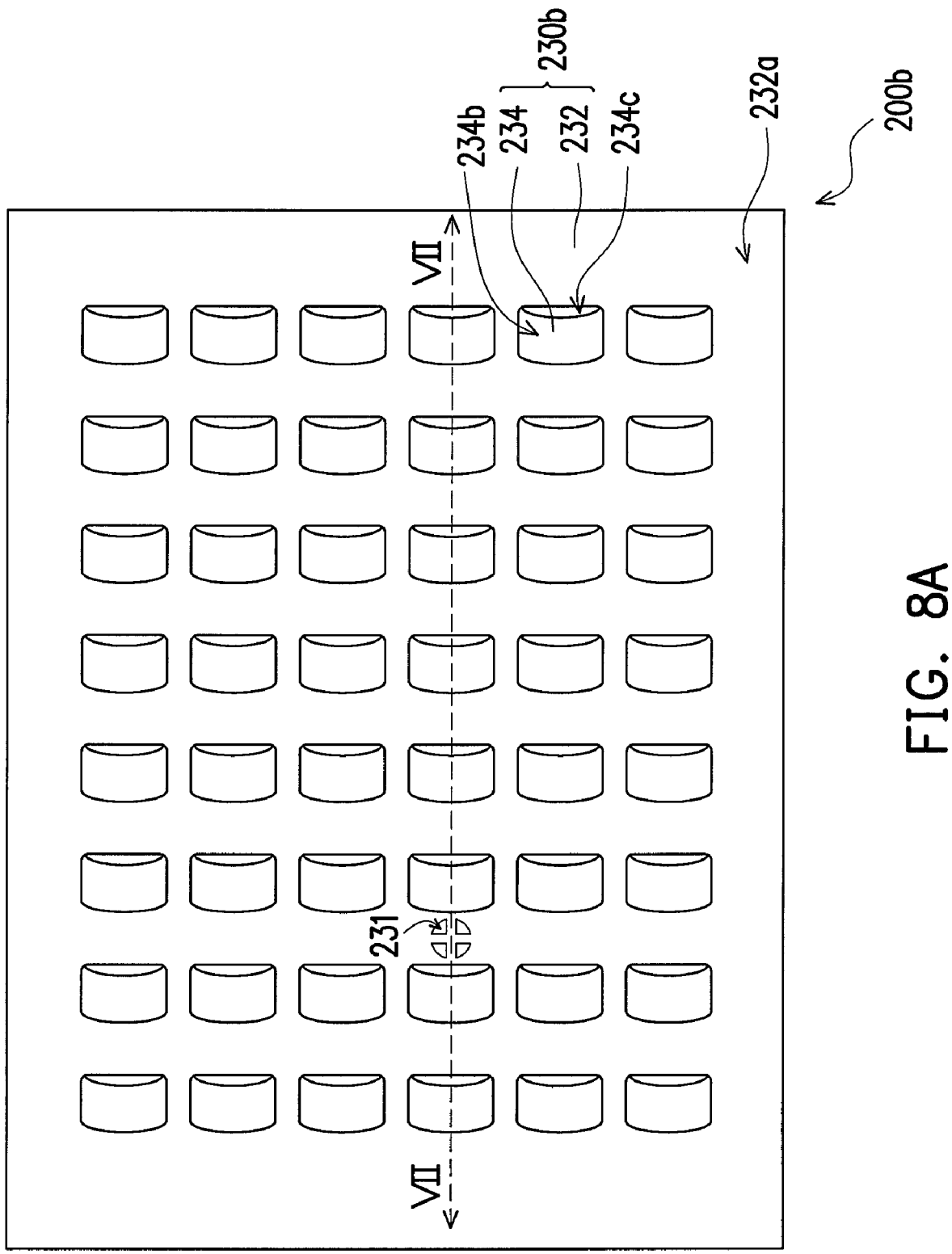
FIG. 8A is a schematic top view of a light emitting device according to another embodiment of the invention.
Figure 8B:
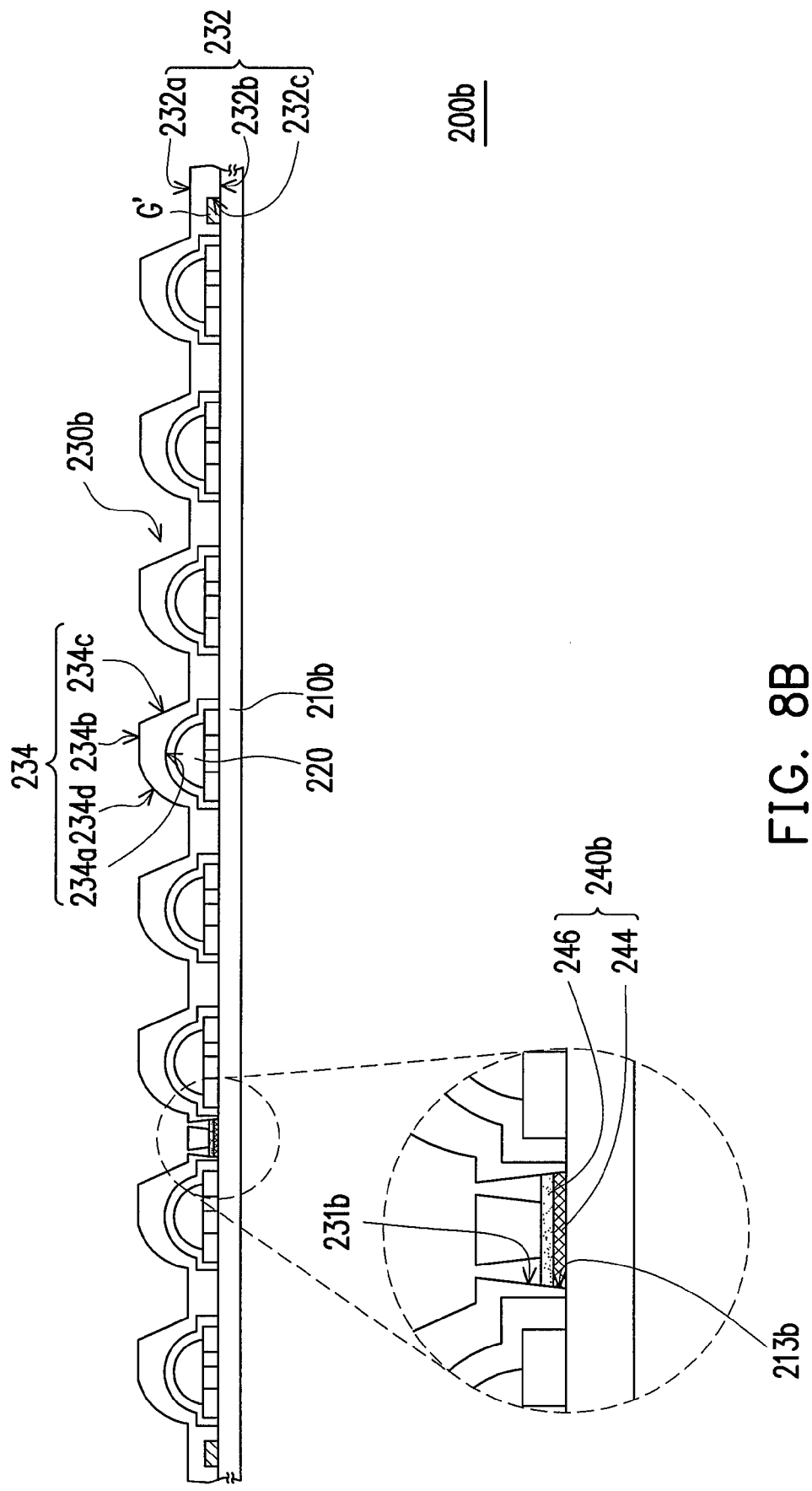
FIG. 8B is a schematic side view taken along line VII-VII in FIG. 8A.

FIG. 8A is a schematic top view of a light emitting device according to another embodiment of the invention. FIG. 8B is a schematic side view taken along line VII-VII in FIG. 8A. Referring to FIGS. 8A and 8B, the light source module 200b of the present embodiment is similar to the light source module 200 in FIG. 3A, and the main difference therebetween is that the light source module 200b of the present embodiment further includes a permeable membrane structure 240b, and the transparent plate 230b has at least one through hole 231b formed therein.

In more detail, the transparent plate 230b further has a cavity 213b formed at the side far away from the light emitting surface 234b. Herein, the cavity 213b communicates with the through holes 231b, and the permeable membrane structure 240b is disposed in the cavity 213b and covers the through holes 231b. In another embodiment of the present invention, the permeable membrane structure 240b is directly covered at an end of the through holes 231b far away from the light emitting surface 234b without disposing in the cavity 231b. Namely, another end of the through holes 231b opposite to the end far away from the light emitting surface 234b is communicated with external environment. The permeable membrane structure 240b of the present embodiment includes a porous membrane 244 and an adhesive layer 246. Herein, the permeable membrane structure 240b is adhered to the transparent plate 230b via the adhesive layer 246. The porous membrane 244 of the present embodiment is, for example, polytetrafluoroethylene porous membrane, but the present embodiment is not limited thereto. Besides, in the present embodiment, each of the through hole 231b has incline sidewalls. In another embodiment, each of the through holes 231b has the same internal diameter.

It should be noted that the light-emitting element 210 of the present embodiment is disposed on the carrier 210b by a solder paste. In general, the solder paste contains a solder flux. When the light source module 200b works, the solder flux will be gasified. In the light source module 200b of the present embodiment, the permeable membrane structure 240b is disposed in the cavity 213b of the transparent plate 230b and covers the through holes 231b. Therefore, the gasified solder flux will be taken out of the light source module 200b through the permeable membrane structure 240b. However, the moisture from the outside environment will not enter into the light source module 200b. The light-emitting element 210 thus prevents from moisture and vapour damaging due to the permeable membrane structure 240b of the present invention. The permeable membrane structure 240b of the present embodiment can achieve the dust-proof, moisture-proof and air-permeable effects of the light source module 200b, and further uniformize the light emitted by the light-emitting element 220, thereby achieving better illumination effect.

It should be noted that the permeable membrane structure 240b is not limited to be applied to the structure of the light source module 200 in FIG. 3A to form the light emitting device 200b of the present embodiment. In other embodiments, the permeable membrane structure 240b may be applied to the structure of the light source module 200' in FIG. 4A.

Figure 9A:
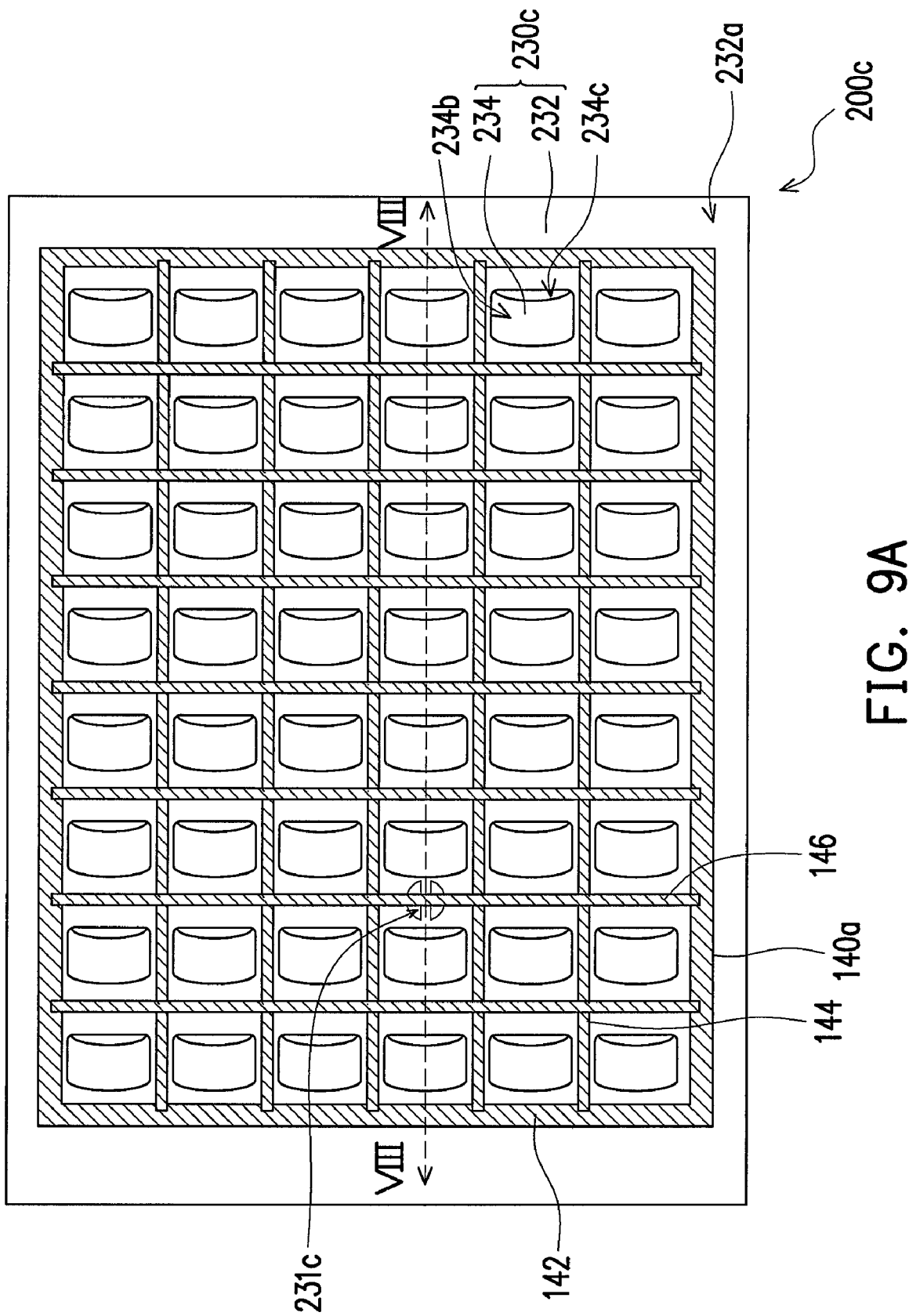
FIG. 9A is a schematic top view of a light emitting device according to still another embodiment of the invention.
Figure 9B:
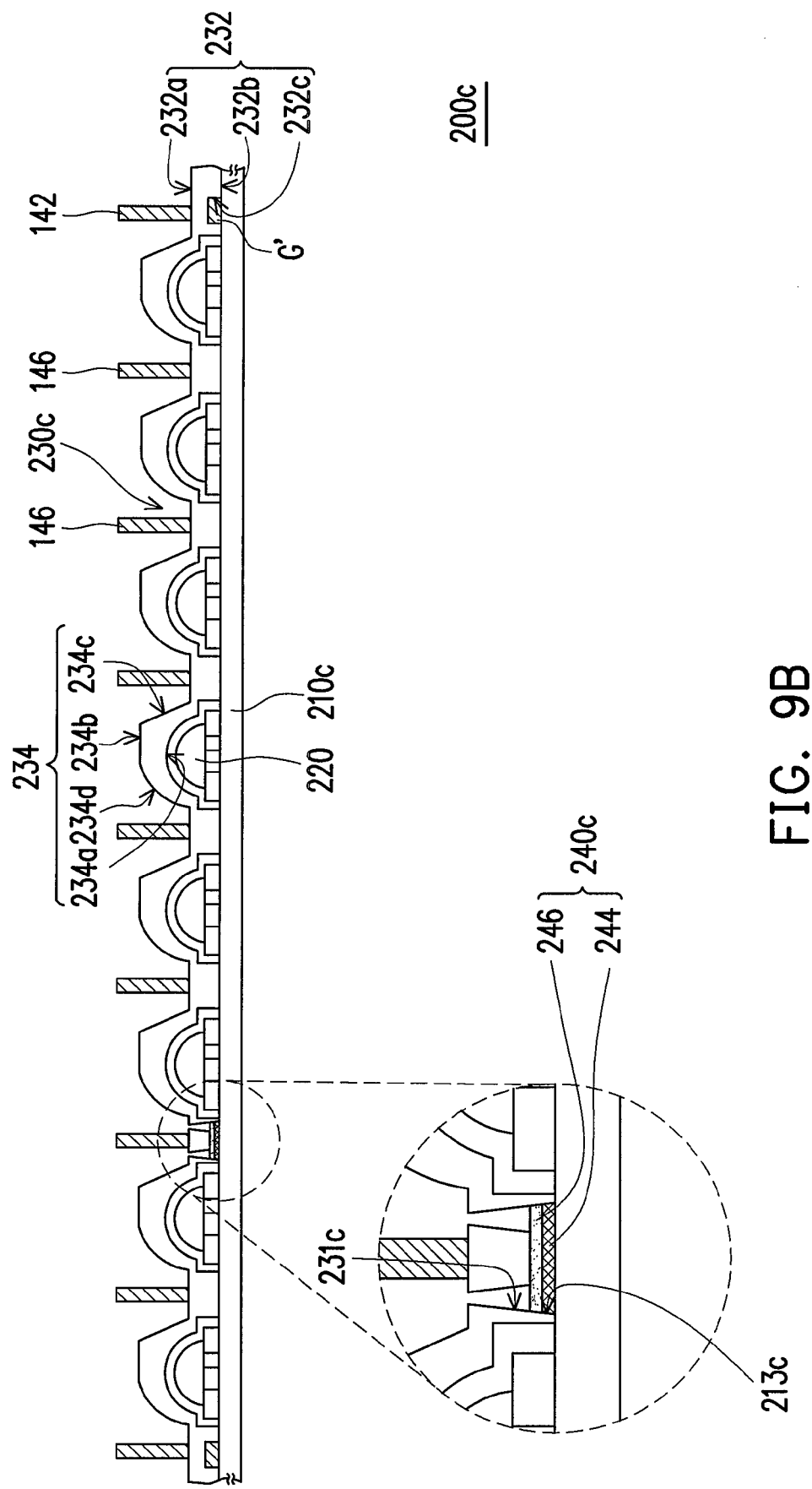
FIG. 9B is a schematic side view taken along line VIII-VIII in FIG. 9A.

FIG. 9A is a schematic top view of a light emitting device according to still another embodiment of the invention. FIG. 9B is a schematic side view taken along line VIII-VIII in FIG. 9A. Referring to FIGS. 9A and 9B, the light emitting device 200c of the present embodiment is similar to the light source module 200a in FIG. 6A, and the main difference therebetween is that the light emitting device 200c of the present embodiment further includes a permeable membrane structure 240c, and the transparent plate 230c has at least one through hole 231c formed therein.

In more detail, the transparent plate 230c further has a cavity 213c formed at the side far away from the light emitting surface 234b. Herein, the cavity 213c communicates with the through holes 231c, and the permeable membrane structure 240c is disposed in the cavity 213c and covers an end of the through holes 231c. In another embodiment of the present invention, the permeable membrane structure 240b is directly covered at an end of the through holes 231c far away from the light emitting surface 234b without disposing in the cavity 213c. Namely, another end of the through holes 231c opposite to the end far away from the light emitting surface 234b is communicated with external environment. The permeable membrane structure 240c of the present embodiment includes a porous membrane 244 and an adhesive layer 246. Herein, the permeable membrane structure 240c is adhered to the transparent plate 230c via the adhesive layer 246. The porous membrane 244 of the present embodiment is, for example, polytetrafluoroethylene porous membrane, but the present embodiment is not limited thereto. Besides, in the present embodiment, each of the through hole 231c has incline sidewalls. In another embodiment, each of the through holes 231c has the same internal diameter.

In the light emitting device 200c of the present embodiment, because the permeable membrane structure 240c covers the through hole 211c, the dust-proof, moisture-proof and air-permeable effects of the light emitting device 200c are achieved. Furthermore, in the embodiment of the invention, the light shielding side wall structure 140a is adopted to cut off or reflect the beam having the large emitting angle emerging from the lens-portion 234. Accordingly, the light emitting device 200c has a smaller emitting angle.

In summary, in the embodiments consistent with the invention, the light emitting elements of the light emitting devices are covered by the lens-portions of the transparent plates, so that the first partial beams of the light beams emitted by the light emitting elements sequentially pass through the light incident surfaces and the light emitting surfaces or the outer curved surfaces with different curvatures. The second partial beams of the light beams pass through the light incident surface and are transmitted to the side surfaces, the first side surfaces or the second side surfaces. Moreover, the side surfaces, the first surfaces or the second side surfaces reflect at least a part of the second partial beams and the part of the second partial beams emerge from the light emitting surfaces or the outer curved surfaces. Hence, not only are the light intensities and the light emitting uniformities of the light emitting devices increased, but the illuminance distributions and the light intensity distributions can also be controlled through the side surfaces, the first side surfaces or the second side surfaces. At the same time, the occurrence of glares and double visions is also prevented for the light emitting devices to achieve a better illumination effect. In addition, in the embodiment of the invention, the flat-portion of the transparent plate has the recess, which allows the light emitting elements and the electronic elements on the carrier to be waterproof for ensuring the electrical quality of the light emitting devices.

Furthermore, in the embodiment of the invention, the light shielding side wall structure is adopted to cut off or reflect the beam having the large emitting angle refracted from the lens-portion. Accordingly, the light emitting device has a smaller emitting angle. Moreover, the light emitting device of the present invention has permeable membrane structure, so as to achieve the dust-proof, moisture-proof and air-permeable effects of the light emitting device, and further uniformize the light emitted by the light-emitting element, thereby achieving better illumination effect.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A light emitting device, comprising:
   a carrier;
   a light emitting element, disposed on the carrier and electrically connected to the carrier;
   a transparent plate, disposed on the carrier and having at least one through hole formed therein, the transparent plate comprising:
      a flat-portion, having an upper surface and a lower surface relative to the upper surface, and the lower surface directly disposed on the carrier;
      a lens-portion, covering the light emitting element, and having a light incident surface, a light emitting surface relative to the light incident surface, and a first side surface and a second side surface connecting the upper surface and the light emitting surface, wherein the light emitting element is suitable for emitting a light beam, a first partial beam of the light beam passes through the light incident surface and leaves from the light emitting surface, a second partial beam of the light beam passes through the light incident surface and is transmitted to the first side surface or the second side surface, and the first side surface or the second side surface reflects at least a part of the second partial beam of the light beam to be passed through the light emitting surface; and
   a permeable membrane structure disposed on a surface of the transparent plate, the permeable membrane structure covering an end of the through hole far away from the light emitting surface.

2. The light emitting device as claimed in claim 1, wherein the first side surface and the second side surface are planes.

3. The light emitting device as claimed in claim 2, wherein a tilting angle of the first side surface relative to the upper surface and a tilting angle of the second side surface relative to the upper surface are substantially different or the same.

4. The light emitting device as claimed in claim 1, wherein the first side surface and the second side surface are respectively a plane and a curved surface.

5. The light emitting device as claimed in claim 1, wherein the light incident surface is a curved surface concaving towards the light emitting surface.

6. The light emitting device as claimed in claim 1, wherein the flat portion of the transparent plate further comprises a trench which is disposed around the lower surface, and the trench is circularly disposed around the light emitting element.

7. The light emitting device as claimed in claim 1, wherein the transparent plate further has a cavity at the side far away from the light emitting surface, the cavity communicates with the through hole, and the permeable membrane structure is disposed in the cavity.

8. The light emitting device as claimed in claim 1, wherein the permeable membrane structure comprises an adhesive layer and a porous membrane, the permeable membrane structure is adhered to the transparent plate via the adhesive layer.

9. A light emitting device, comprising:
   a carrier;
   a light emitting element, disposed on the carrier and electrically connected to the carrier;
   a transparent plate, disposed on the carrier and having at least one through hole formed therein, the transparent plate comprising:
      a flat-portion, having an upper surface and a lower surface relative to the upper surface, the lower surface directly disposed on the carrier;
      a lens-portion, covering the light emitting element, having a light incident surface and a side surface and a positive camber connected to the upper surface, wherein the light emitting element is suitable for emitting a light beam, a first partial beam of the light beam passes through the light incident surface and leaves the positive camber, a second partial beam of the light beam passes through the light incident surface and is transmitted to the side surface, and the side surface reflects at least a part of the second partial beam of the light beam to be passed through the positive camber; and
   a permeable membrane structure disposed on a surface of the transparent plate, the permeable membrane structure covering an end of the through hole far away from the light emitting surface.

10. The light emitting device as claimed in claim 9, wherein the light incident surface is a curved surface concaving towards the positive camber.

11. The light emitting device as claimed in claim 9, wherein a curvature of the light incident surface and a curvature of the positive camber are substantially different.

12. The light emitting device as claimed in claim 9, wherein the flat portion of the transparent plate further comprises a trench which is disposed around the lower surface, and the trench is circularly disposed around the light emitting element.

13. The light emitting device as claimed in claim 9, wherein the transparent plate further has a cavity at the side far away from the light emitting surface, the cavity communicates with the through hole, and the permeable membrane structure is disposed in the cavity.

14. The light emitting device as claimed in claim 9, wherein the permeable membrane structure comprises an adhesive layer and a porous membrane, the permeable membrane structure is adhered to the transparent plate via the adhesive layer.

15. A light emitting device, comprising:
a carrier;
at least one light emitting element disposed on the carrier and electrically connected to the carrier;
a transparent plate disposed on the carrier and having at least one through hole formed therein, the transparent plate comprising:
a flat-portion having an upper surface and a lower surface opposite to the upper surface, and the lower surface closed to the carrier;
at least one lens-portion covering the light emitting element;
a light shielding side wall structure disposed on the upper surface of the flat-portion and surrounding the lens-portion; and
at least one permeable membrane structure disposed on a surface of the transparent plate, the permeable membrane structure covering an end of the through hole far away from the light emitting surface.

16. The light emitting device as claimed in claim 15, wherein the at least one light emitting element is a plurality of light emitting elements, the at least one lens-portion is a plurality of lens-portions, the lens-portions respectively cover the light emitting elements, the lens-portions are aligned into a plurality of rows and a plurality of columns to form a two-dimensional array, the light shielding side wall structure comprising:
an outer reflective frame disposed on the upper surface of the flat-portion and surrounding the lens-portion;
a plurality of first reflective partition plates disposed on the upper surface of the flat-portion, wherein each of the first reflective partition plates is disposed between the two neighboring columns; and
a plurality of second reflective partition plates disposed on the upper surface of the flat-portion, wherein each of the second reflective partition plates is disposed between the two neighboring rows.

17. The light emitting device as claimed in claim 15, wherein the lens-portion has a light incident surface, a light emitting surface, a first side surface, and a second side surface, the light emitting surface being opposite to the light incident surface, the first side surface and the second side surface connecting the upper surface and the light emitting surface, the light emitting element is adapted to emit a beam, a first partial beam of the beam passes through the light incident surface and emerges from the light emitting surface, a second partial beam of the beam passes through the light incident surface and is transmitted to the first side surface or the second side surface, the first side surface or the second side surface reflects at least one part of the second partial beam of the beam, and the part of the second partial beam emerges from the light emitting surface, and the light shielding side wall structure is adapted to reflect a part of the beam.

18. The light emitting device as claimed in claim 17, wherein the first side surface and the second side surface are flat surfaces.

19. The light emitting device as claimed in claim 18, wherein a tilting angle of the first side surface and a tilting angle of the second side surface relative to the upper surface are substantially different or the same.

20. The light emitting device as claimed in claim 17, wherein the first side surface and the second side surface are respectively a flat surface and a curved surface, and the light incident surface is a curved surface concaving toward the light emitting surface.

21. The light emitting device as claimed in claim 15, wherein the lens-portion has a light incident surface, a side surface, and an outer curved surface, the side surface and the outer curved surface is connected to the upper surface, the light emitting element is adapted to emit a beam, a first partial beam of the beam passes through the light incident surface and emerges from the outer curved surface, a second partial beam of the beam passes through the light incident surface and is transmitted to the side surface, the side surface reflects at least one part of the second partial beam of the beam, and the part of the second partial beam emerges from the outer curved surface, and the light shielding side wall structure is adapted to reflect a part of the beam.

22. The light emitting device as claimed in claim 21, wherein the light incident surface is a curved surface concaving towards the outer curved surface.

23. The light emitting device as claimed in claim 21, wherein a curvature of the light incident surface and a curvature of the outer curved surface are substantially different.

24. The light emitting device as claimed in claim 15, wherein the flat portion of the transparent plate further comprises a recess which is disposed around the lower surface, and the recess is circularly disposed around the light emitting element.

25. The light emitting device as claimed in claim 15, wherein the transparent plate further has a cavity at the side far away from the light emitting surface, the cavity communicates with the through hole, and the permeable membrane structure is disposed in the cavity.

26. The light emitting device as claimed in claim 15, wherein the permeable membrane structure comprises an adhesive layer and a porous membrane, the permeable membrane structure is adhered to the transparent plate via the adhesive layer.

* * * * *